United States Patent [19]
Yamazaki

[11] Patent Number: 5,989,480
[45] Date of Patent: Nov. 23, 1999

[54] APPARATUS FOR MOLDING PATTERNED PRODUCT AND METHOD OF MOLDING PATTERNED PRODUCT

[75] Inventor: Seiichi Yamazaki, Kyoto, Japan

[73] Assignee: Nissha Printing Co., Ltd., Kyoto, Japan

[21] Appl. No.: 08/930,453

[22] PCT Filed: Jan. 30, 1997

[86] PCT No.: PCT/JP97/00220

§ 371 Date: Sep. 30, 1997

§ 102(e) Date: Sep. 30, 1997

[87] PCT Pub. No.: WO97/27987

PCT Pub. Date: Aug. 8, 1997

[30] Foreign Application Priority Data

Jan. 31, 1996 [JP] Japan ..................................... 8-038958

[51] Int. Cl.$^6$ ............................. B29C 45/14; B29C 45/16
[52] U.S. Cl. ......................... 264/511; 264/153; 264/251; 264/266; 425/112; 425/122; 425/126.1; 425/129.1; 425/292; 425/302.1; 425/305.1
[58] Field of Search .................................... 264/153, 265, 264/266, 511, 510, 251, 255; 425/112, 122, 126.1, 129.1, 302.1, 305.1, 546, 292

[56] References Cited

U.S. PATENT DOCUMENTS

| | | |
|---|---|---|
| 4,639,341 | 1/1987 | Hanamoto et al. ...................... 264/511 |
| 4,994,224 | 2/1991 | Itoh et al. ................................ 264/511 |
| 5,283,028 | 2/1994 | Breezer et al. .......................... 264/511 |
| 5,401,457 | 3/1995 | Valyi ....................................... 264/153 |
| 5,427,518 | 6/1995 | Morizot et al. .......................... 425/504 |
| 5,635,129 | 6/1997 | Breezer et al. .......................... 264/263 |
| 5,707,581 | 1/1998 | Yamazaki ................................ 425/112 |

FOREIGN PATENT DOCUMENTS 59-194848  11/1984  Japan .

Primary Examiner—Angela Ortiz
Attorney, Agent, or Firm—Wenderoth, Lind & Ponack, L.L.P.

[57] ABSTRACT

An apparatus for manufacturing a decorated molded product includes a first clamping device for pressing an insert film to a parting face of a fixed mold to enclose a cavity and an injection gate. The fixed mold has a vacuum suction port and the injection gate for a molten resin. A movable mold has a runner facing the injection gate and communicating with the cavity. The insert film is held between the fixed mold and movable mold, so that a pattern of the insert film is formed to a molded product simultaneously when the product is injection-molded. The insert film after being pressed to a surface of the fixed mold by the first clamping device is brought into tight contact with the fixed mold by vacuum suction, and the molten resin is injected from the injection gate to pass through the runner of the movable mold from a hole formed in the insert film to finally reach the cavity and fill a gap between the insert film and movable mold.

12 Claims, 15 Drawing Sheets

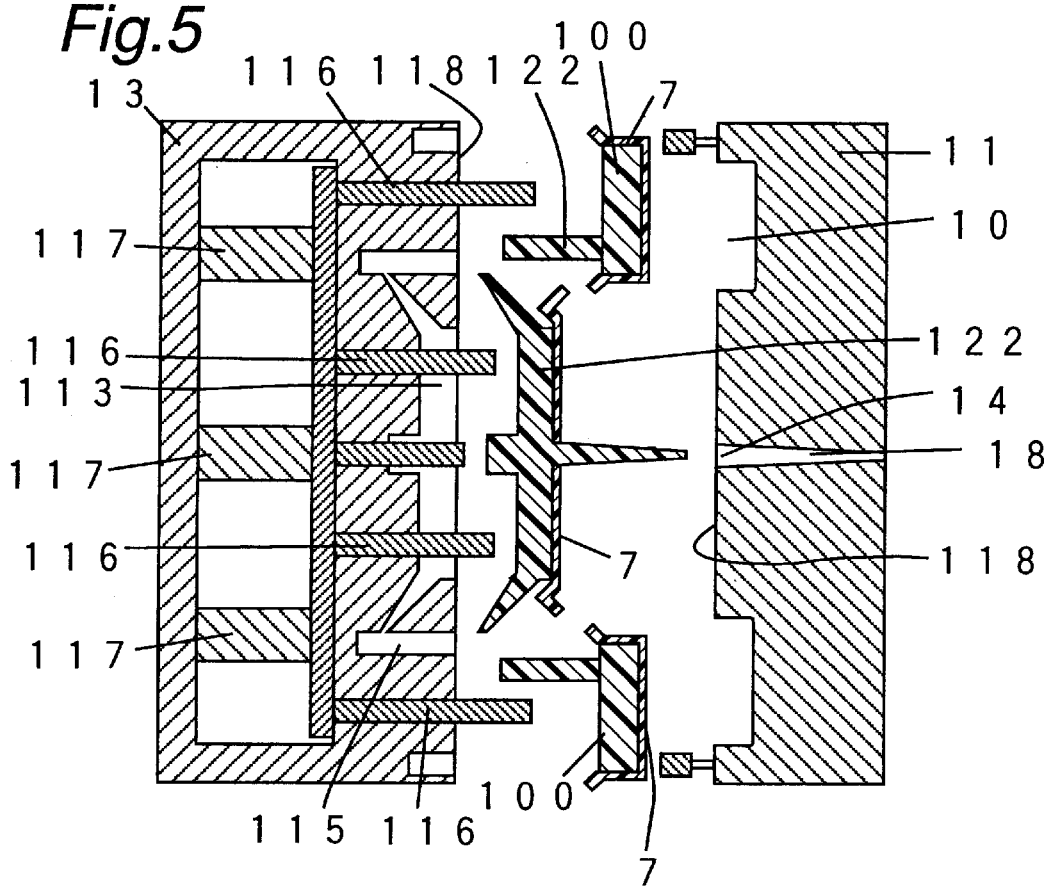
Fig.5
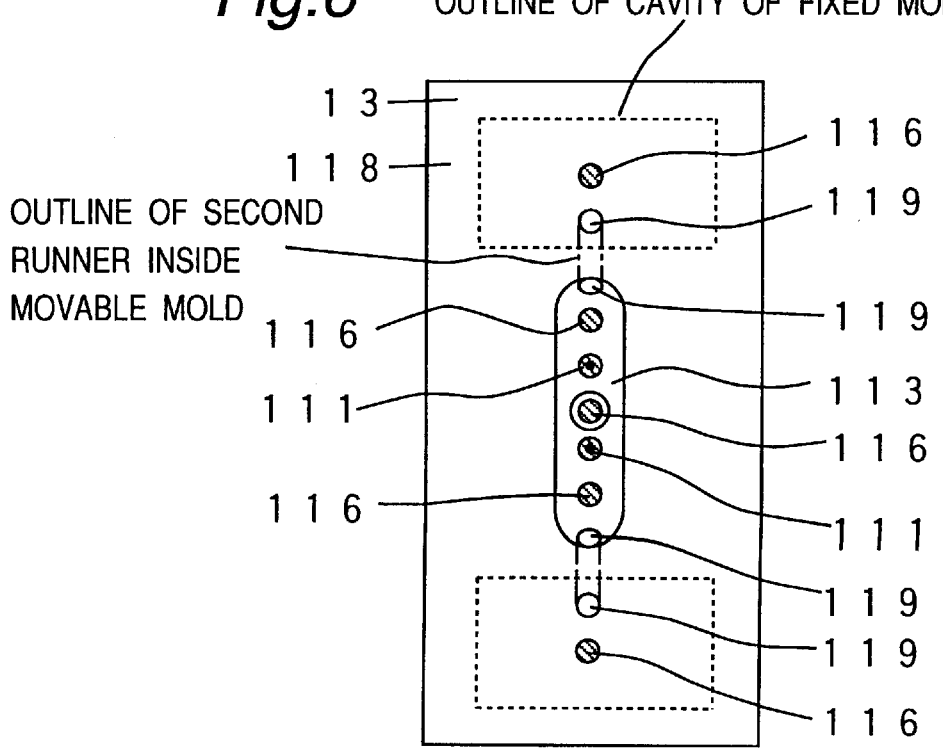
Fig.6 OUTLINE OF CAVITY OF FIXED MOLD
OUTLINE OF SECOND RUNNER INSIDE MOVABLE MOLD

APPARATUS FOR MOLDING PATTERNED PRODUCT AND METHOD OF MOLDING PATTERNED PRODUCT

TECHNICAL FIELD

The present invention relates to a method and an apparatus for manufacturing decorated molded products, e.g., interior and exterior parts of automobiles such as console panels, armrests, coin trays, center posts, wheel covers, meter panels, dashboards, switch bases, instrument panels, operation buttons, vessels; or front panels and operation buttons of AV devices or household electric appliances like washing machines, rice cookers, water purifiers, etc.

BACKGROUND ART

There has been conventionally executed a technique whereby a decorated molded product is manufactured by a transfer molding method wherein a decoration pattern on a transfer film held between fixed and movable molds is transferred through a transfer method to a molded object simultaneously with injection molding of the object. Since a resin is injected from the side of the fixed mold in the above technique, generally, the transfer film is held in tight contact with the movable mold, so that the resin is filled between the transfer film and the fixed mold.

Meanwhile, in some cases, the resin is filled between the movable mold and the transfer film which is kept in touch with the fixed mold although the resin is similarly injected from the fixed mold as above. For example, as disclosed in the published specification of Unexamined Japanese Patent Laid-Open Publication No. 59-194848, holes are formed in the transfer film taken out from a coil and the resin is injected and filled from the fixed mold to a gap between the movable mold of a molding part and the transfer film through the holes of the transfer film. The holes of the transfer film are formed in any of the following methods: (1) A hole formation device is set in the fixed mold, and the transfer film is cut by a blade after clamping of the molds, whereby holes of a size passing the resin are formed; (2) The transfer film is pierced and broken by an injection nozzle after clamping of the molds; (3) The transfer film is pierced and broken with a pressure of the resin injected after clamping of the molds.

All of the above methods have problems.

Specifically, when the transfer film is cut, a large amount of cutting dust is mixed into the molten resin. The cutting dust is also accumulated thereby to clog an opening part of a runner. Moreover, the cutting dust is accumulated at parting faces thereby to damage the molds. Since the hole formation device is buried in the mold, the mold is complicated and bulky in structure, which miniaturizes a cavity. The method is poor in practical utility.

According to the methods (2) or (3), the transfer film is forcibly broken by the injection nozzle or molten resin, and therefore it is impossible to surely open small holes in the transfer film. Even when the hole is opened, a large broken tongue-like piece of the film tightly adheres to the movable mold, clogging the opening part of the runner in the movable mold and obstructing the molten resin in flowing.

An object of the present invention is to solve the aforementioned problems and provide an apparatus and a method for manufacturing decorated molded products whereby the generation of cutting dust is restricted and a small hole is surely formed in an insert film to pass a molten resin.

DISCLOSURE OF INVENTION

In order to accomplish the above objective, the present invention is constituted as follows.

An apparatus for manufacturing decorated molded products according to a first aspect of the present invention comprises:

an injection mold equipped with a fixed mold having a vacuum suction port and an injection gate for a molten resin and, a movable mold having a runner facing the injection gate and communicating with a cavity;

a film introduction device for introducing an insert film to between the fixed mold and movable mold;

a first clamping device for pressing the insert film introduced by the film introduction device to a surface of the fixed mold so as to enclose the cavity and injection gate;

a cutting device arranged at either a predetermined position at the upstream side of the surface of the fixed mold or a predetermined position of the first clamping device faced to the upstream side for cutting the insert film at the upstream side of the surface of the fixed mold when the insert film is pressed to the fixed mold by the first clamping device; and a second clamping device arranged at the downstream side of the surface of the fixed mold for fixing a cut end part of the insert film.

According to a second aspect of the present invention, the film introduction device in the first aspect can be rendered movable above the fixed mold.

According to a third aspect of the present invention, the vacuum suction port can be formed at a parting face of the fixed mold in the first or second aspects.

According to a fourth aspect of the present invention, the cutting device can be a heat cutter in any one of the first through third aspects.

According to a fifth aspect of the present invention, the runner of the movable mold can be reduced in breadth at a position where the runner faces the injection gate of the fixed mold in any one of the first through fourth aspects.

According to a sixth aspect of the present invention, the fixed mold can be a hot runner mold in any one of the first through fifth aspects.

According to a seventh aspect of the present invention, a fixing pin for pressing the insert film to the vicinity of the injection gate of the fixed mold can be set in the runner of the movable mold in any one of the first through sixth aspects.

According to an eighth aspect of the present invention, the fixing pin of the seventh aspect can be a hook-like undercut pin which has a slide bar buried in the movable mold in a manner to be slidable in a slantwise direction to the parting face and a head having front and rear faces respectively pressing the insert film to the fixed mold and coming in touch with. the molten resin running in the runner. The head can be retreated in a slantwise upward direction of the runner by sliding of the slide bar when the fixed mold and movable mold are opened.

According to a ninth aspect of the present invention, in either of the seventh and eighth aspects, a plurality of fixing pins can be set to surround the position facing the injection gate of the fixed mold.

A method for manufacturing decorated molded products is provided according to a tenth aspect of the present invention in order to accomplish the aforementioned objective, whereby an insert film is held between a fixed mold having a vacuum suction port and an injection gate for a molten resin and a movable mold facing the injection gate and having a runner communicating with a cavity, so that a pattern of the insert film is formed to a molded object simultaneously with injection molding of the object. In the manufacturing method of the tenth aspect, the insert film after being pressed to a surface of the fixed mold by a first clamping device is brought in tight contact with the fixed mold through vacuum suction, then the molds are closed and the molten resin is injected from the injection gate, which runs out of holes formed in the insert film to reach the cavity through the runner of the movable mold and fill a gap between the insert film and movable mold.

In an eleventh aspect of the present invention, with the use of the manufacturing apparatus of any one of the first through ninth aspects, the method includes:

holding a cut end part of the insert film by a pinching device of the film introduction device;

moving the pinching device holding the cut end part of the insert film thereby to introduce the insert film between the first clamping device and the fixed mold so that a pattern of the insert film is positioned at a front face of the cavity of the fixed mold;

fixing the cut end part of the insert film to a second clamping device;

freeing the insert film from the pinching device;

pulling out the pinching device from between the first clamping device and the fixed mold;

cutting the insert film by the cutting device at the upstream side of the cavity when the insert film is pressed to the fixed mold by the first clamping device and vacuum-sucking the insert film from the vacuum suction port so that the insert film is brought into tight contact with the fixed mold; and closing the fixed and movable molds and injecting the molten resin into the cavity from the injection gate to fill the gap between the insert film and movable mold.

According to a twelfth aspect of the present invention, while the insert film at an upper part of the cutting device is caught by the pinching device, the insert film is cut by the cutting device at the upstream side of the cavity between the fixed and movable molds in the eleventh aspect.

According to a thirteenth aspect of the present invention, the manufacturing apparatus can be provided with a take-out roll device for taking out the insert film in any one of the first through ninth aspects, so that the insert film taken out by the take-out roll device can be introduced between the fixed and movable molds by the film introduction device.

According to a fourteenth aspect of the present invention, in any one of the first through ninth aspects and thirteenth aspect, the insert film secured by the first and second clamping devices can be broken by heat and an injection pressure of the molten resin injected from the injection gate, whereby holes can be formed through which the injected molten resin is filled in the cavity via the runner.

According to a fifteenth aspect of the present invention, the take-out roll device in the thirteenth or fourteenth aspects can be rendered movable above the fixed mold.

According to a sixteenth aspect of the present invention, in any one of the tenth-twelfth aspects, the insert film taken out from the take-out roll device can be pressed by the first clamping device to the surface of the fixed mold.

According to a seventeenth aspect of the present invention, in any one of the tenth-twelfth aspects and sixteenth aspect, the insert film can be broken by heat and an injection pressure of the molten resin injected from the injection gate, whereby holes can be formed through which the injected molten resin is filled in the cavity via the runner.

BRIEF DESCRIPTION OF DRAWINGS

These and other objects and features of the present invention will become clear from the following description taken in conjunction with the preferred embodiments thereof with reference to the accompanying drawings in which:

FIG. 5 is a sectional view showing another process in the apparatus and the method for manufacturing a decorated molded product in the embodiment of the present invention;

FIG. 6 is a plan view of a movable mold of the manufacturing apparatus in the embodiment of the present invention;

BEST MODE FOR CARRYING OUT THE INVENTION

Figure 1:
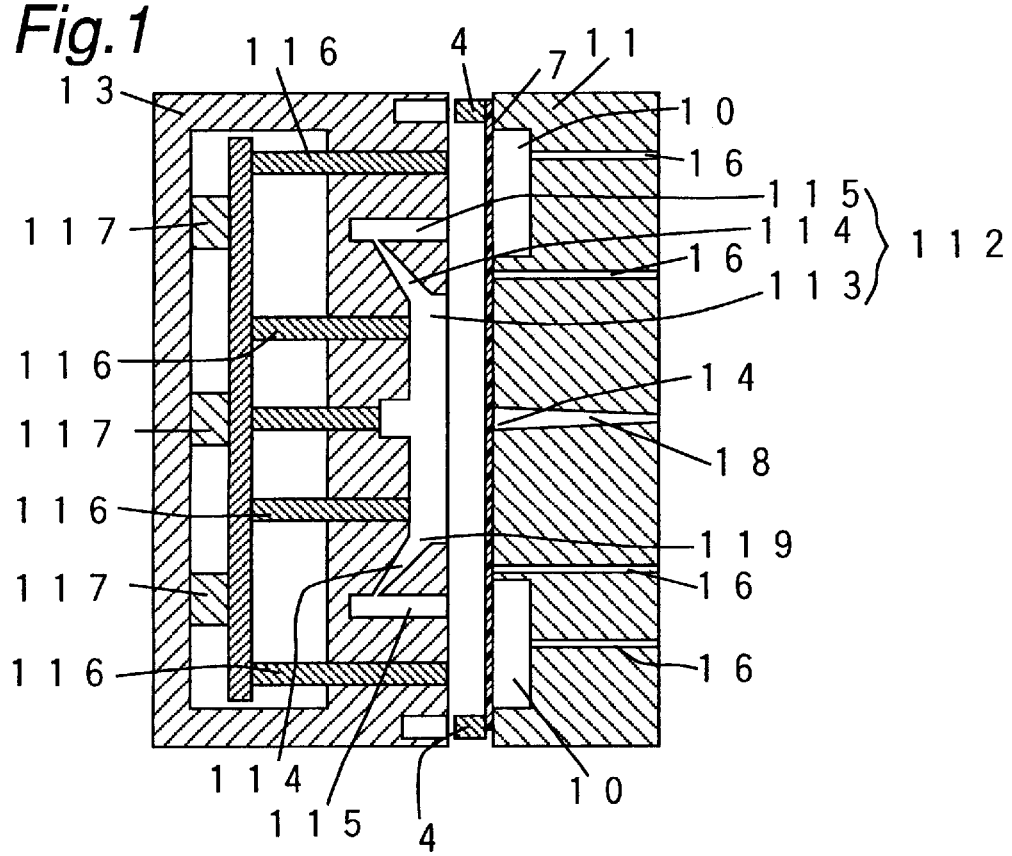
FIG. 1 is a sectional view showing one process in an apparatus and a method for manufacturing a decorated molded product in an embodiment of the present invention.
Figure 2:
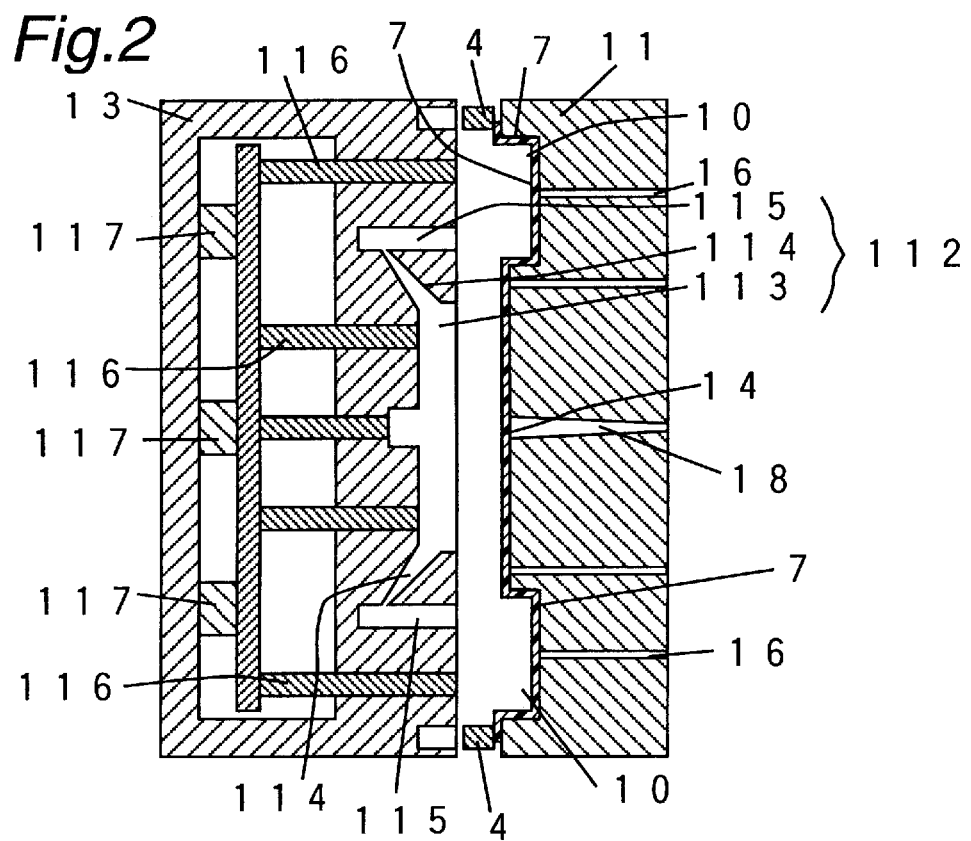
FIG. 2 is a sectional view showing another process in the apparatus and the method for manufacturing a decorated molded product in the embodiment of the present invention.

Before the description of the present invention proceeds, it is to be noted here that like parts are designated by like reference numerals through the accompanying drawings.

Hereinbelow, the present invention will be described in detail taken in conjunction with preferred embodiments thereof with reference to the drawings.

An apparatus for manufacturing decorated molded products in a preferred embodiment of the present invention comprises a first clamping device 4 for pressing an insert film 7 against a parting face of a fixed mold 11 in a manner to enclose a cavity 10 and an injection gate 14, the fixed mold 11 having a vacuum suction port 16 and the injection gate 14 for a molten resin 17, and a movable mold 13 having a runner 112 facing the injection fate 14 and communicating with the cavity 10. In the apparatus, decoration patterns in the insert film 7 held between the fixed mold 11 and movable mold 13 are molded in a product simultaneously with injection molding of the product. After the insert film 7 is pressed to a surface of the fixed mold 11 by the first clamping device 4, the insert film 7 is brought into tight contact with the fixed mold 11 through vacuum suction, and the molten resin is injected from the injection gate 14 to reach the cavity 10 via the runner 112 of the movable mold 13 from a hole formed in the insert film 7, whereby the molten resin 17 is filled between the insert film 7 and movable mold 13. This is a fundamental concept of the apparatus. FIGS. 1–25 show the manufacturing apparatus in accordance with the above embodiment of the present invention.

The insert film 7 for use in the manufacturing apparatus or in a method for manufacturing decorated molded products of the present embodiment is wound at the upstream side thereof to a take-out roll device and at the downstream side thereof to a wind device. Alternatively, the insert film is wound at the upstream side to the take-out roll device, with the downstream side being a cut end part. Also, the insert film may be cut into sheets. A pattern layer, a bonding layer, etc. are sequentially laminated on a base sheet in the insert film 7. The base sheet is not released in some cases after a molding resin is bonded to the insert film 7. The base sheet is formed of various kinds of resin, e.g., polyethylene terephthalate, acryl, thermoplastic elastomer, etc. The pattern layer applies decorative features or functions to a surface of the molded product. The pattern layer has a general printing pattern or a conductive pattern formed of a conductive material, etc. A resin binder and a pigment or dye are used for the pattern layer. A resin binder and an opacifying metallic pigment or inorganic pigment, etc. are utilizable as well for the pattern layer. The bonding layer is a layer bonding the insert film 7 with the molded product. A heat-sensitive or pressure-sensitive resin fit for the molding resin is suitably used in the bonding layer. For instance, when the molding resin is acrylic resin or urethane, polyvinyl chloride-vinyl acetate copolymer resin can be used for the bonding layer. The pattern layer and bonding layer are formed by printing in various manners.

The vacuum suction port 16 can be formed at a parting face 118 of the fixed mold 11.

The fixed mold 11 or first clamping device 4 may be provided with a cutting device 5 having a heat cutter to separate the insert film 7 introduced into the mold into a sheet part of a size covering at least the first clamping device 4 and a band part continuous with a roll of the insert film.

Figure 7:
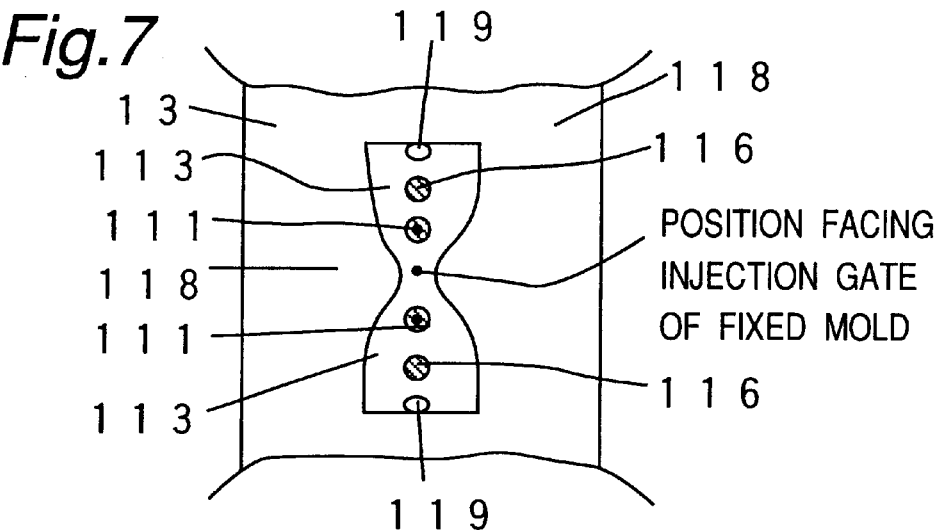
FIG. 7 is a plan view of another movable mold of the manufacturing apparatus in the embodiment of the present invention.

The runner 112 has a first runner 113, a second runner 114, a third runner 115 and the like. In FIG. 7, the first runner 113 of the movable mold 13 may be reduced in breadth at a position facing the injection gate 14 of the fixed mold 11. Or, in FIG. 8, the first runner 113 of the movable mold 13 can be narrowed in breadth at the position facing the injection gate 14 of the fixed mold 11 and furthermore reduced between the position facing the injection gate 14 of the fixed mold 11 and a fixing pin 111.

Figure 9:
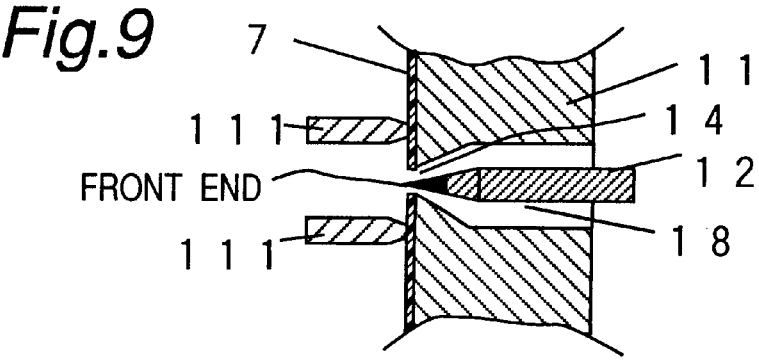
FIG. 9 is a sectional view of a fixed mold of the manufacturing apparatus in the embodiment of the present invention.

As indicated in FIG. 9, the fixed mold 11 may be a hot-runner mold which is a mold having a hot runner incorporated therein. A runner-less molded product is obtained in the hot runner because the flow of the molten resin is controlled through temperature control by a heater. Since a front end of a hot chip 12 is close to the injection gate 14 of the fixed mold 11, the insert film 7 is softened or melted by the heat at the front end of the hot chip 12 at the position confronting the injection gate, which facilitates opening of holes in the insert film 7.

Figure 10:
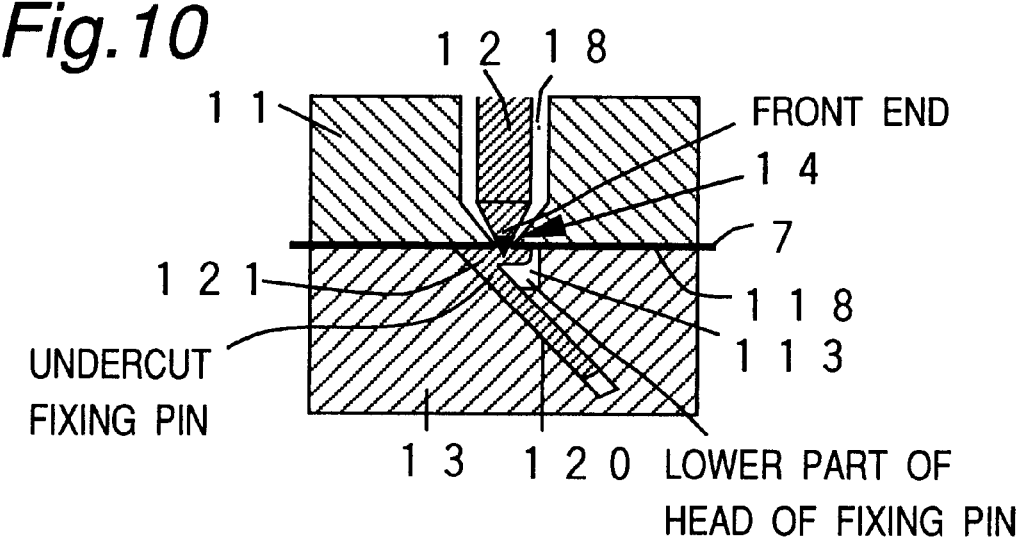
FIG. 10 is a sectional view of a movable mold of the manufacturing apparatus in the embodiment of the present invention.
Figure 11:
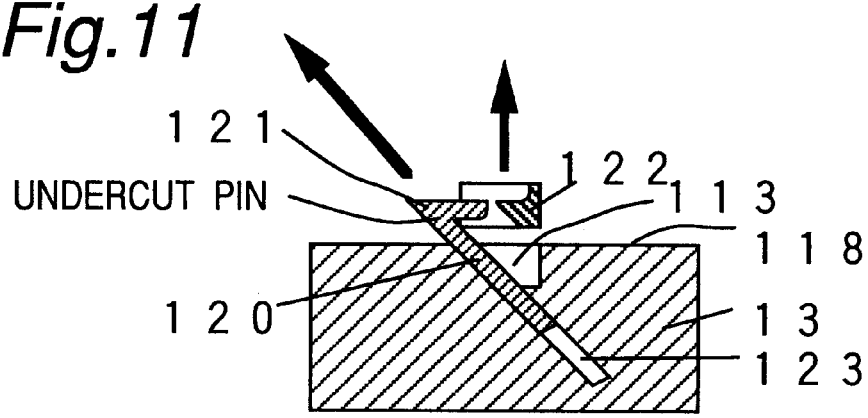
FIG. 11 is another sectional view of such movable mold of the manufacturing apparatus in the embodiment of the present invention.
Figure 12:
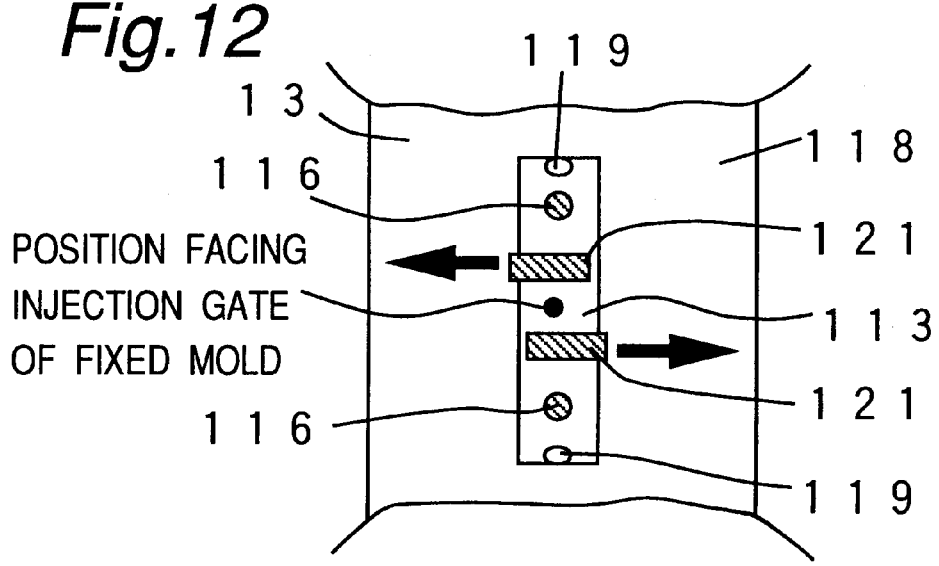
FIG. 12 is the plan view of a movable mold of the manufacturing apparatus in the embodiment of the present invention.
Figure 13:
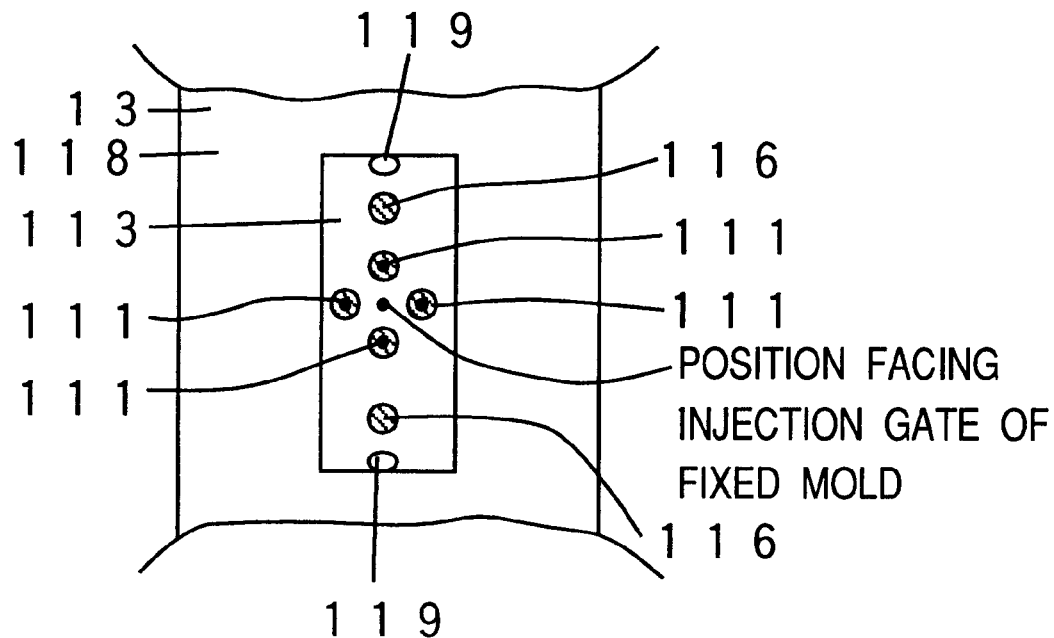
FIG. 13 is a plan view of another movable mold of the manufacturing apparatus in the embodiment of the present invention.
Figure 14:
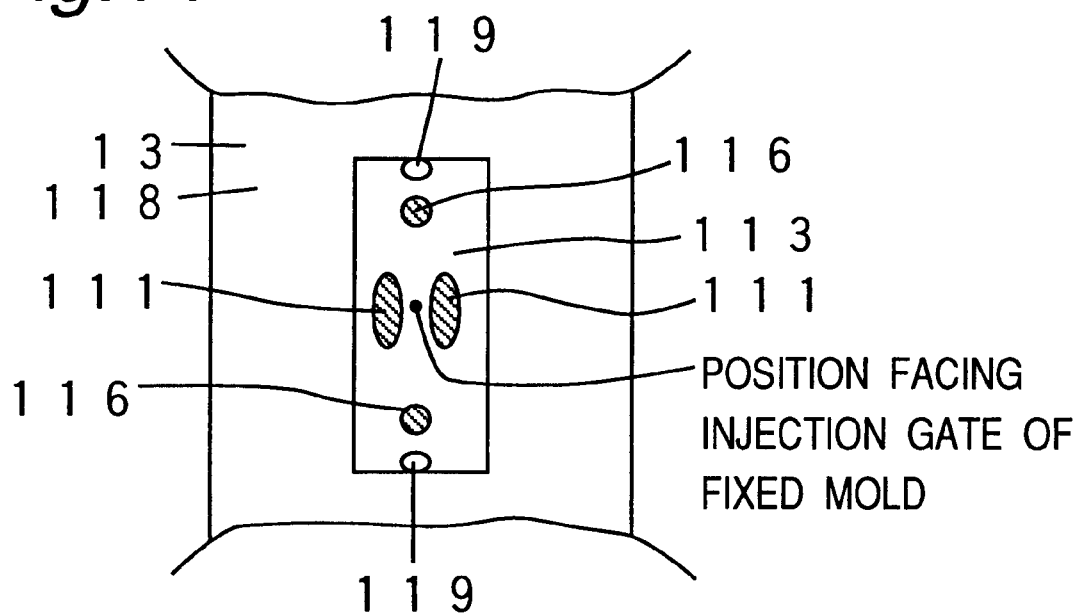
FIG. 14 is a plan view of another movable mold of the manufacturing apparatus in the embodiment of the present invention.

The movable mold 13 may be equipped with a fixing pin 111 in the runner 112 (FIGS. 6–8 and FIGS. 10–12). The fixing pin 111 presses the insert film 7 to the vicinity of the injection gate of the fixed mold 11. The fixing pin 111 is, as shown in FIGS. 10–12, a hook-shaped undercut pin having a slide bar 120 buried in the movable mold 13 in a slidable fashion in a slantwise direction to the parting face 118 and a head 121 with a front face for pressing the insert film 7 to the fixed mold 11 and a rear face in touch with the molten resin 17 running in the runner 112. The head 121 of the fixing pin 111 may be designed to be retreated slantwise upward of the runner 112 subsequent to sliding of the slide bar 120 when the fixed mold 11 and movable mold 13 are opened. The fixing pin 111 may comprise a plurality of fixing pins, as shown in FIGS. 13 and 14, which are disposed in the periphery of a part facing the injection gate 14 of the fixed mold 11.

The manufacturing apparatus of this embodiment comprises an injection mold 1, a take-out roll device 2, a film introduction device 3, a main clamp device 4 serving as an example of the first clamping device, a cutting device 5, a sub clamp device 6 functioning as an example of a second clamping device, and a heating and take-out device 9 for taking out a molded product as well as heating the insert film. The take-out roll device 2 is of a type having a series of the insert films 7 wound therearound in rolls. The film introduction device 3 is provided with a pinching device 30 and a driving device 31 (FIGS. 15–25).

The injection mold 1 is comprised of the fixed mold 11 and the movable mold 13 having the runner 112 facing the injection gate 14 and communicating with the cavity 10. The fixed mold 11 includes the parting face 118 to which the insert film 7 is pressed by the main clamp device 4 to be described later, the cavity 10 to which the insert film 7 is held in tight contact through vacuum suction or with a pressure of the molten resin 17, and the injection gate 14 for the molten resin 17. The movable mold 13 is set to a movable block 126, while the fixed mold 11 is mounted to a fixed block 125. Tie bars 19 guide both blocks, letting the movable block 126 be moved toward or away from the fixed block 125.

In the fixed mold 11 are provided the cavity 10 to which the insert film 7 is held in close contact by way of vacuum suction or the pressure of the molten resin 17, a resin injection path 18 thereof and the injection gate 14 thereof. The resin injection path 18 is coupled to an injection nozzle 124. The cavity 10 is formed in the movable mold 13 instead of the fixed mold 11 in some arrangements. The injection gate 14 is opened at the parting face 118 of the fixed mold 11. The fixed mold 11 has the main clamp device 4 for pressing the insert film 7 to the parting face 118.

The fixed mold 11 has the vacuum suction ports 16. The fixed mold 11 may have the vacuum suction ports 16 at the parting face to the movable mold 13 (FIGS. 1–4, FIGS. 21–23). More specifically, the fixed mold 11 has the vacuum suction ports 16 formed at the inner side at a position of the parting face where the first clamp device 4 contacts. The parting face at least from the vacuum suction ports 16 to the cavity 10 is rendered a minutely roughed face. The minutely roughed face constitutes a ventilation path to easily guide the air in the cavity 10 to the vacuum suction ports 16 of the parting face or a ventilation path to guide the air between the insert film 7 and fixed mold 11 in the vicinity of the injection gate 14 into the cavity 10 or to the vacuum suction ports 16 at the parting face 118. The minutely roughed face is formed by etching or chemically melting a surface of the mold or, mechanically cutting the surface, i.e., NC machining using a numerically controlled grinder or a numerically controlled planer, etc. Recesses of the minutely roughed face may be countless fine grooves extending radially from the cavity 10. The minutely roughed face may be formed partially in the periphery of the cavity 10 of the fixed mold 11 or in the whole periphery of the cavity 10 of the fixed mold 11. When the minutely roughed face is formed in the whole periphery of the cavity 10, the insert film 7 is advantageously kept in tight contact with an inner face of the cavity 10 or the parting face 118 uniformly. The fixed mold 11 may have a plurality of vacuum suction ports 16 formed in a groove surrounding the cavity 10, so that the parting face 118 up to the cavity 10 from the groove is the minutely roughed face.

The fixed mold 11 is a hot-runner mold in FIG. 9. The hot-runner mold is a mold having a hot runner incorporated therein. The hot runner means a method of obtaining a runner-less molded product by controlling the flow of the molten resin through temperature control by a heater. Since the front end of the hot chip 12 is near the injection gate 14 of the fixed mold 11, the insert film 7 is softened or melted by the heat at the front end of the hot chip 12 at the position confronting the injection gate 14, and therefore a hole can be easily formed in the insert film 7.

Figure 15:
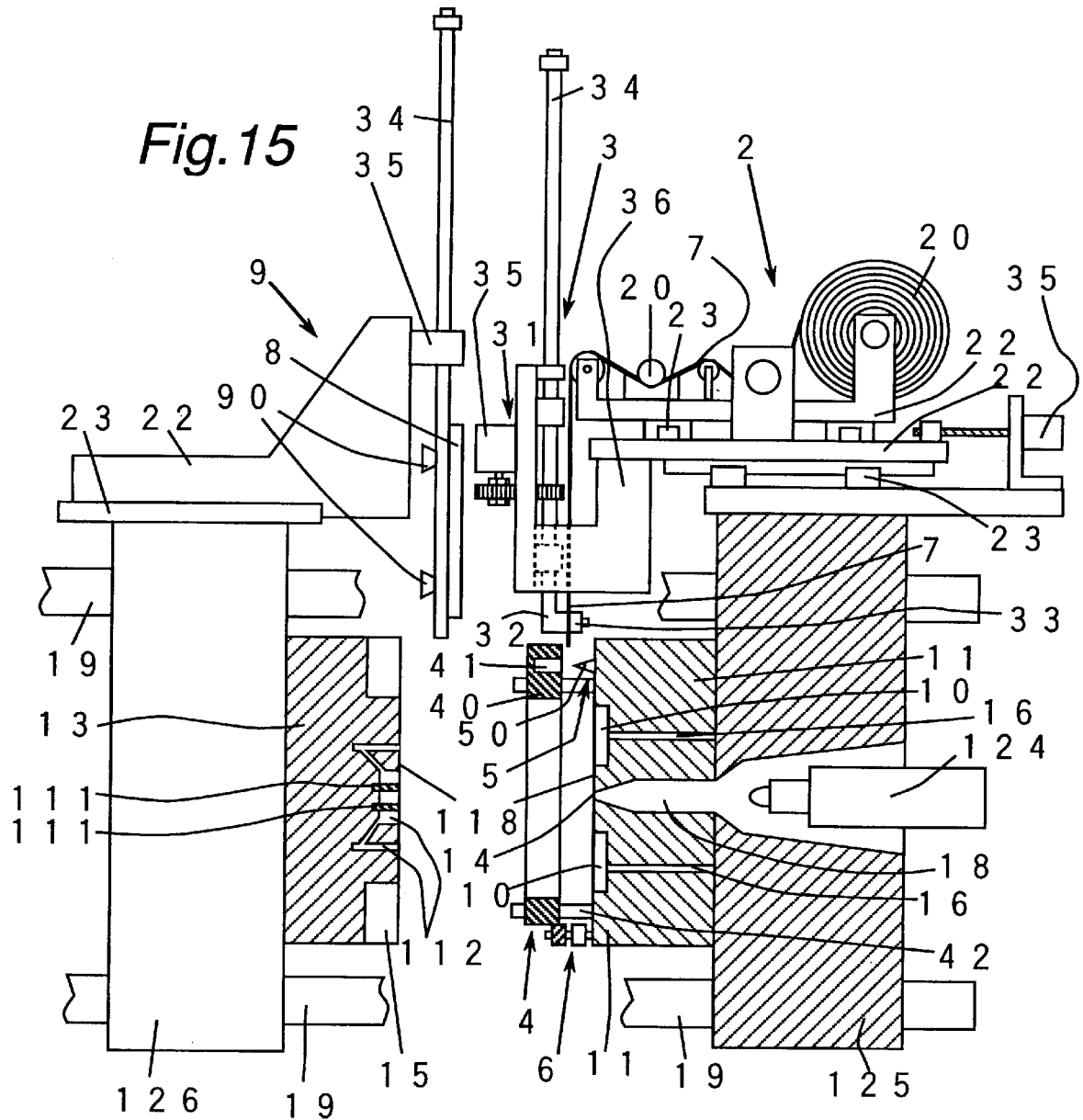
FIG. 15 is a partial sectional view showing one process in the apparatus and the method for manufacturing a decorated molded product in the embodiment of the present invention.

The movable mold 13 includes the runner 112 where the molten resin 17 injected from the fixed mold 11 flows and passes, the fixing pins 111, ejector pins 116, etc. The runner 112 is opened at the parting face 118 of the movable mold 13. The ejector pins 116 come in and out of the parting face 118. The ejector pins 116 projecting from the parting face 118 of the movable mold 13 push out a decorated molded product 100 adhering to the movable mold 13. The ejector pins 116 are brought in and out of the parting face 118 by a force of a driving part 117 such as a hydraulic cylinder incorporated in an injection molding apparatus. A clamp accommodation part 15 may be arranged in the movable mold. 13 to store the main clamp device 4 or sub clamp device 6 of the fixed mold 11 to be described later (FIG. 15, etc.).

Figure 8:
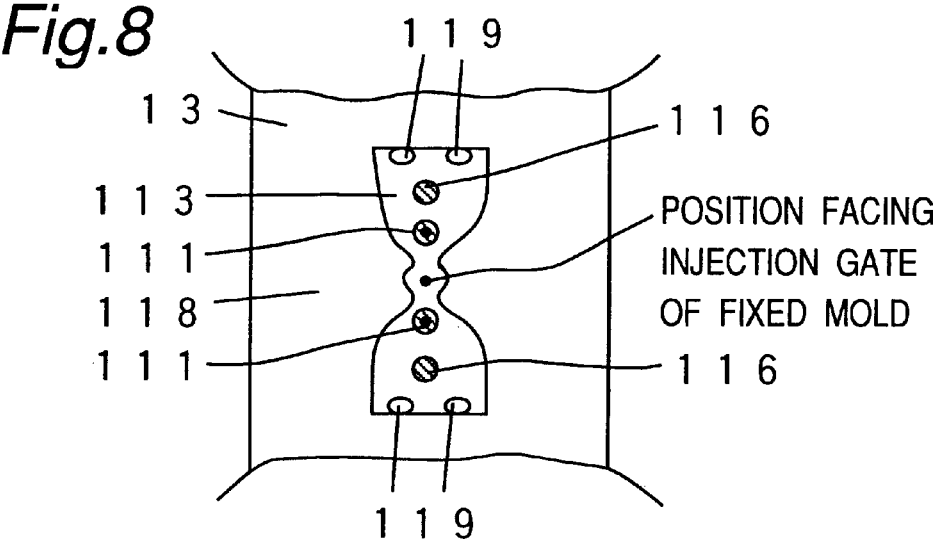
FIG. 8 is a plan view of another movable mold of the manufacturing apparatus in the embodiment of the present invention.

The runner 112 includes the first runner 113, the second runner 114, the third runner 115, etc. (FIG. 1, etc.). The first runner 113 is installed to face the injection gate 14 of the fixed mold 11. The third runner 115 is arranged to have an opening part 119 at a position opposite to the cavity 10. The second runner 114 is a runner connecting the first runner 113 with the third runner 115. The first runner 113 has the opening part 119 to the second runner 114. The first runner 113 may be reduced in breadth at the position faced to the injection gate 14 of the fixed mold 11 (FIG. 7), or both at the position faced to the injection gate 14 of the fixed mold 11 and further between the position faced to the injection gate 14 of the fixed mold 11 and the fixing pins 111 (FIG. 8). In the latter arrangement, when the insert film 7 is pressed to the fixed mold 11 via the parting face 118 of the mold, the insert film 7 can be pressed more closely to the position faced to the injection gate 14 of the fixed mold 11, and at the same time, the insert film 7 can be pressed more strongly owing to a force acting when the molds are clamped. Therefore, a hole of a pin point is formed in the insert film 7 when the molten resin 17 is injected into the runner 112, without breaking an unnecessary part of the insert film 7. The arrangement is effective to avoid generating dust from cutting of the insert film 7 and to not produce a large broken piece of the insert film.

The fixing pin 111 for pressing the insert film 7 to the vicinity of the injection gate of the fixed mold 11 is set in the first runner 113. The aforementioned vicinity of the injection gate is the vicinity of a position facing the injection gate 14 of the fixed mold 11. A count of the fixing pins 111 is one or not smaller than 2. Fixing pins 111 may be arranged to surround the position facing the injection gate 14 of the fixed mold 11 (FIG. 13). The fixing pin 111 is either made movable to project or retreat to the first runner 113 of the movable mold 13 by a force of a spring, hydraulic cylinder or air cylinder, etc., or kept stationary. The fixing pin 111 is a circular column, circular column tapered to a front end thereof (FIG. 1, etc.), circular cone, elliptic column (FIG. 14) or the like. The fixing pin 111 may be the hook-like undercut pin having the slide bar 120 buried in the movable mold 13 to be slidable in a direction inclined to the parting face 118 and the head 121 including front and rear faces respectively pressing the insert film 7 to the fixed mold 11 and in touch with the molten resin 17 flowing in the first runner 113. The slide bar 120 may slide along an insertion path 123 when the fixed mold 11 and the movable mold 13 are opened, thereby to retreat the head 121 in the slantwise upward direction of the first runner 113. In this case, since the insert film 7 is pressed by the fixing pin 111 at a wider area to the fixed mold 11, the insert film 7 can be pressed more strongly, and consequently the hole formed in the insert film 7 because of the pressure of the molten resin 17 is efficiently small.

The take-up roll device 2 includes a roll 20 of a series of the insert film 7 where the series of the insert film 7 is in a roll wound, etc. and supplies the insert film 7 continuously to between the fixed mold 11 and movable mold 13 of the injection mold 1. The take-up roll device 2 may be set directly above the fixed mold 11 via a slide table 22 or on the slide table 22 of the film introduction device 3 to be described later (FIGS. 15–20). The slide table 22 is slid back and forth and right and left on guide rails 23 by a stepping motor or servo motor 35 or the like. The insert film 7 taken out from the take-up roll device 2 is introduced between the movable mold 13 and fixed mold 11 via a turn roll 21, guide roll and the like. The insert film roll 20 and the turn roll 21 or guide roll are arranged laterally or longitudinally in parallel to each other.

Figure 25:
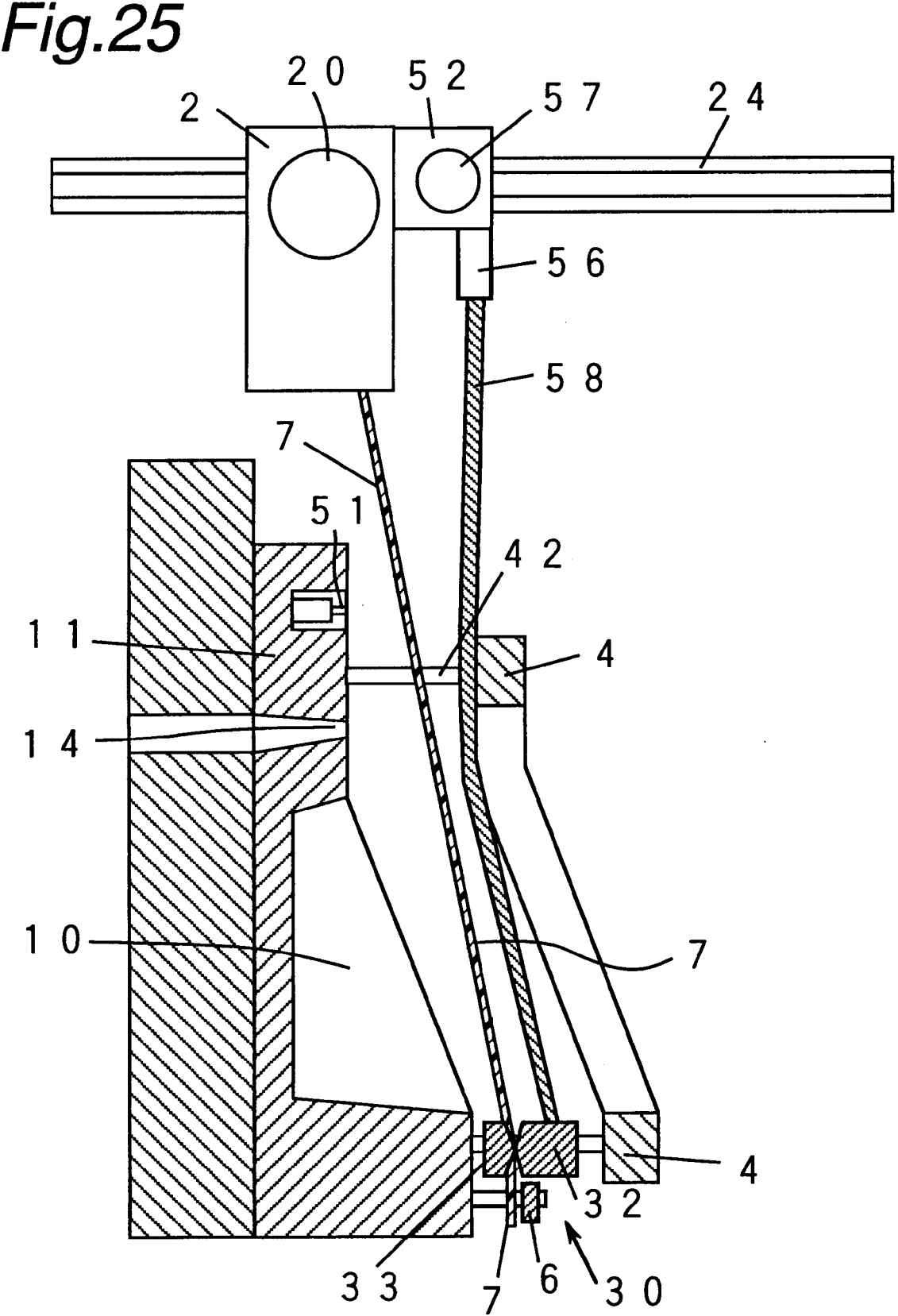
FIG. 25 is a partial sectional view showing another process in the apparatus and the method for manufacturing a decorated molded product in the embodiment of the present invention.

The film introduction device 3 introduces the insert film 7 taken out from the take-up roll device 2 to between the movable mold 13 and fixed mold 11. The film introduction device 3 may be set directly above the fixed block via the slide table 22 (FIGS. 15–20) or may be adapted to freely move together with the take-up roll device 2, etc. along the rail above the fixed mold 11 (FIG. 25). When the fixed mold 11 or insert film roll 20 is to be exchanged, advantageously, the film introduction device 3 and the take-up roll device 2 are temporarily retreated away from the fixed mold 11. The slide table 22 is slid forward/backward and right/left on the guide rails 23 by the stepping motor or servo motor 35, etc.

The film introduction device 3 has the pinching device 30 and the driving device 31. The pinching device 30 holding a cut end part 70 of the insert film 7 is provided with a pinch head 32 and a pinch roll 33 which have metal, synthetic resin, rubber or the like. The pinch head 32 and pinch roll 33 are in point contact or line contact or face contact with each other via the insert film 7. The pinch head 32 and pinch roll 33 are mounted to the driving device 31. The driving device 31 reciprocates the pinch head 32 and pinch roll 33 between the upstream and downstream sides of the cavity 10 of the fixed mold 11 or movable mold 13. The driving device 31 includes a driving part, a shaft 34, etc. By way of example, in the driving part, the rotation of the stepping motor, servo motor 35 or the like is interlocked with the rotation of the ball screw via a timing belt or the like, thereby to generate the up/down movement of the pinch head 32 and pinch roll 33 by the rotation of the ball screw. The driving part is fitted to a frame 36 set at an end of the slide table 22. The stepping motor, servo motor 35, etc. constituting the driving device 31 can be finely adjusted with regard to forward/backward rotation, rotating speed, etc. and therefore can position the insert film 7 at a correct position on the cavity 10.

The driving device 31 of the film introduction device 3 has a driving part 52 and a deformable wire 58. The pinching device 30 may be coupled to the driving part 52 via the deformable wire 58 (FIGS. 21–25).

Some type of the driving device 31 is equipped with a hollow wire guide 56 and a wire reel 57. One end of the deformable wire 58 passed through a hollow part of the wire guide 56 is wound around the wire reel 57, while the other end of the wire 58 is fixed to the pinching device 30. The wire 58 can move the pinching device 30 up/down while adjusting a take-up force and a tensile force of the wire reel 57 to balance with the weight of the pinching device 30. Since the forward/rearward rotation, rotating speed, etc. of the stepping motor and servo motor of the driving part 52, the wire reel 57, etc. can be finely adjusted, a speed for introducing the insert film 7 to a gap between the fixed mold 11 and movable mold 13 can be adjusted or the insert film 7 can be positioned correctly at the gap between the fixed mold 11 and movable mold 13.

A rigid ball screw shaft extending linearly and of a length not smaller than an introduction stroke of the insert film 7 should be set vertically in a coupled body of the pinching device 30 and driving part 52 via a shaft, thus requiring a large space thereabove or therebelow. In contrast, when the deformable wire 58 is employed, the need for this large space is advantageously eliminated.

Figure 24A:
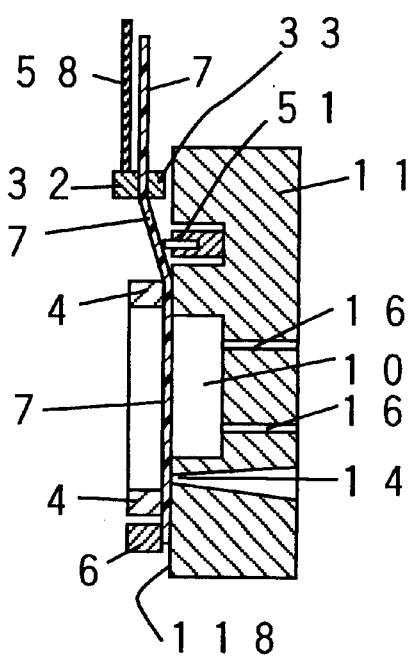
FIG. 24A is a partial sectional view showing one process in the apparatus and the method for manufacturing a decorated molded product in the embodiment of the present invention.
Figure 24B:
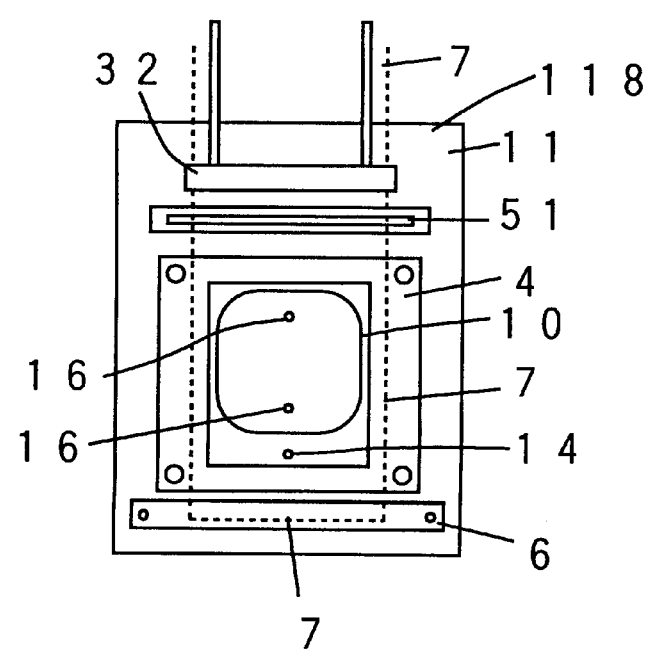
FIG. 24B is a partial plan view showing such process in the apparatus and the method for manufacturing a decorated molded product in the embodiment of the present invention.

The main clamp device 4 presses the insert film 7 introduced between the fixed mold 11 and movable mold 13 towards the fixed mold 11 to enclose the cavity 10 and injection gate 14 (FIGS. 24A, 24B). The main clamp device 4 includes a frame-like clamp head surrounding the peripheral edge of the cavity 10 or a clamp head in the shape of two lateral bars shaped in symbol of "=", and a rod 42 pushing the clamp head to the fixed mold. For example, the main clamp device 4 is constituted to sequentially clamp the insert film 7 to the parting face by means of a plurality of clamping elements separated from a frame-like clamping member to enclose the cavity 10 and injection gate 14 thereby. A shield member of rubber or the like may be disposed at a part where the main clamp device 4 contacts. In this case, a cutting blade storage part may be provided at the surface of the fixed mold 11 at the upstream side of the cavity 10 of the fixed mold 11. Or, a cutting blade 50 may be installed at the upstream side of the cavity 10 of the fixed mold 11 to cut the upstream side of the insert film 7, with a cutting blade storage part 41 set in an upstream clamp head 40 of the main clamp device 4. In the main clamp device 4, the cutting blade 50 may be replaced with a heat cutter 51 which melts and cuts the insert film 7 by heat.

The cutting device 5 cuts the insert film 7 guided into the gap between the fixed mold 11 and movable mold 13, at the upstream side of the cavity 10. In an example of the cutting device 5, the cutting blade 50 is set at the surface of the fixed mold 11 at the upstream side of the cavity 10 of the fixed mold 11, while the cutting blade storage part 41 for receiving the cutting blade 50 is set in the clamp head 40 of the main clamp device 4, so that the main clamp device 4 presses the insert film 7 to the fixed mold 11 and at the same time, cuts the insert film 7. In another example, the cutting blade storage part may be formed at the surface of the afixed mold 11 at the upstream side of the cavity 10, while the cutting blade may be installed in the clamp head 40 of the main clamp device 4. Otherwise, the cutting blade 50 may be set at the surface of the fixed mold 11 at the upstream side of the cavity 10, while the cutting blade storage part may be provided in the movable mold 13, thereby to cut the insert film 7 simultaneously when the fixed mold 11 and movable mold 13 are closed. The cutting blade 50 set at the surface of the fixed mold 11 at the upstream side of the cavity 10 may be at an upper position of the stream than a position where the upstream clamp head 40 of the main clamp device 4 comes into contact with the fixed mold 11. The cutting device 5 may not be necessarily provided directly in the injection mold 1 or main clamp device 4, or the heat cutter 51 is usable as the cutting device to melt and cut the insert film by heat. The heat cutter 51 may be arranged at a position more upstream than the position where the upstream clamp head 40 of the main clamp device 4 is in touch with the fixed mold 11 (FIGS. 24A, 24B). The heat cutter 51 may not be directly set in the injection mold 1 or main clamp device 4.

Specifically, a front end of the cutting blade 50 of the cutting device 5 projects from the surface of the fixed mold 11.

The sub clamp device 6 fixes the cut end part 70 of the insert film 7 guided by the film introduction device 3 into the gap between the fixed mold 11 and movable mold 13, at the downstream side of the cavity 10. The sub clamp device 6 is a member holding the insert film 7 between rod-like members or a pin to be hooked in a hole formed in the insert film 7 (not shown).

Figure 20:
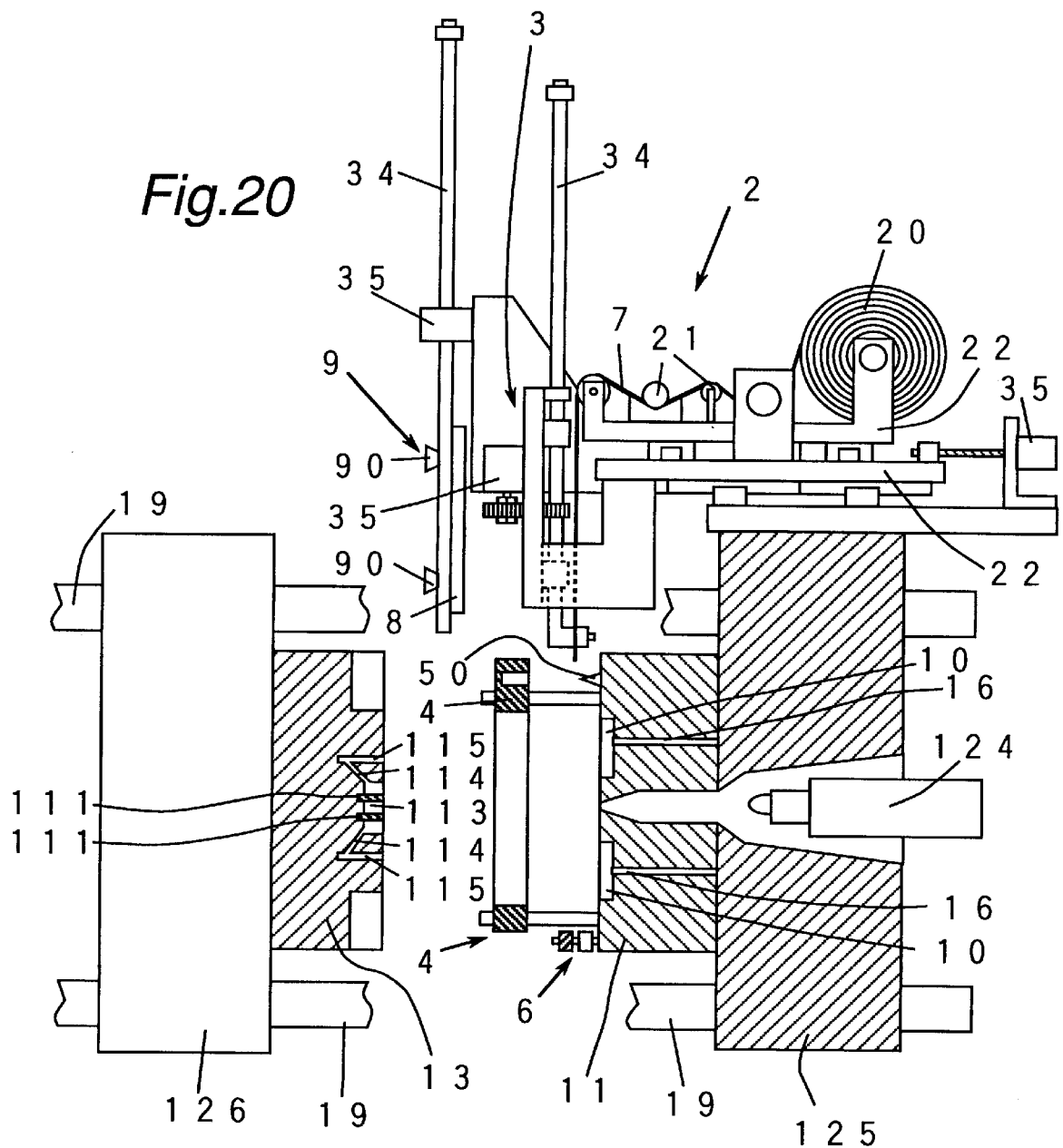
FIG. 20 is a partial sectional view showing another process in the apparatus and the method for manufacturing a decorated molded product in the embodiment of the present invention.
Figure 21:
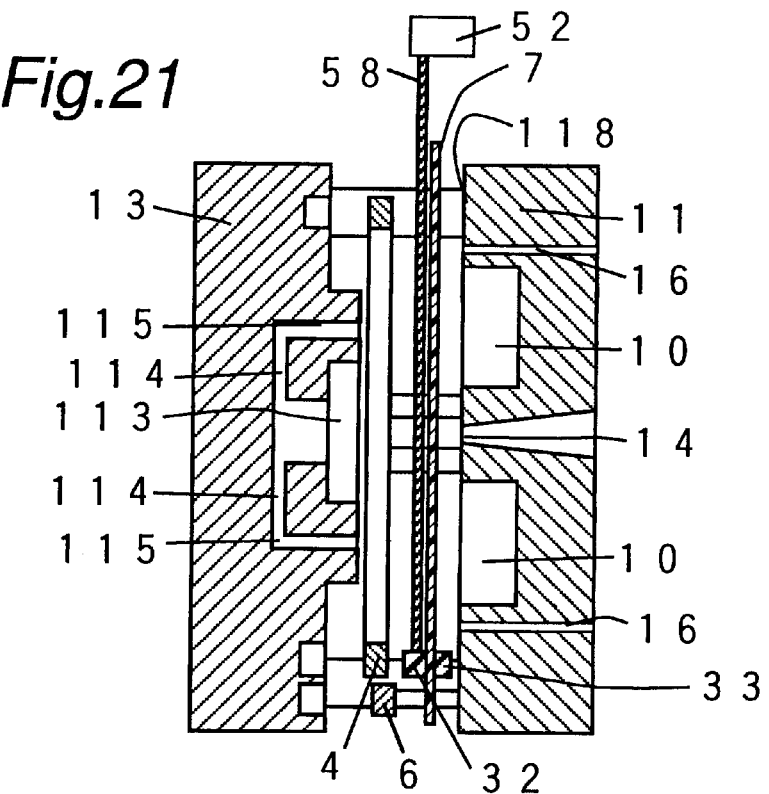
FIG. 21 is a partial sectional view showing one process in the apparatus and the method for manufacturing a decorated molded product in the embodiment of the present invention.
Figure 22:
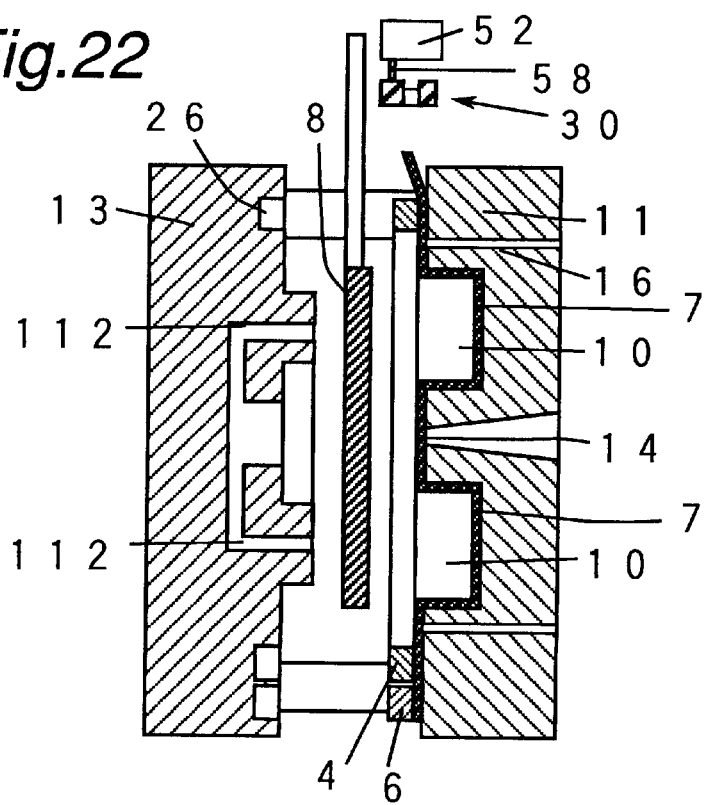
FIG. 22 is a partial sectional view showing another process in the apparatus and the method for manufacturing a decorated molded product in the embodiment of the present invention.
Figure 23:
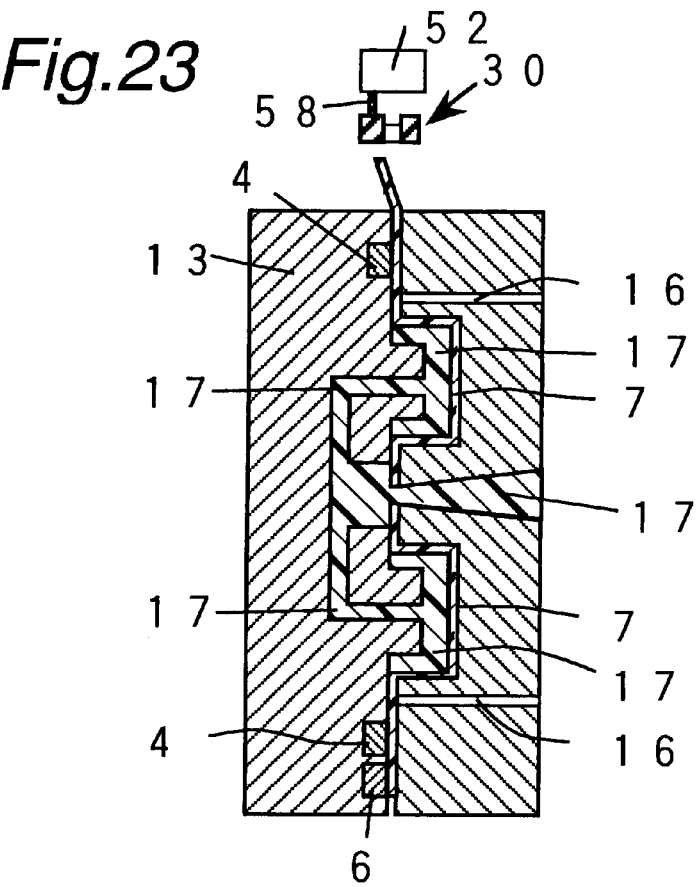
FIG. 23 is a partial sectional view showing another process in the apparatus and the method for manufacturing a decorated molded product in the embodiment of the present invention.

A heater 8 for heating the insert film 7 securely clamped by the main clamp device 4, and a product-holding instrument for taking out the decorated molded product 100 formed in the cavity 10 are arranged at the front and rear sides of the take-out device 9 which moves between the fixed mold 11 and movable mold 13. The heater 8 is a hot plate or a hot wind fan, sucking the air from the fixed vacuum suction port 16 of the fixed mold thereby to soften the insert film 7 beforehand so that the insert film 7 at the surface of the fixed mold 11 is easily adhered to the inner surface of the cavity 10 or the like. The take-out device 9 may be set above the movable block 126 via the slide table 22 (FIGS. 15–19) or above the fixed block 125 (FIG. 20). The slide table 22 is slid back/forth and right/left on the guide rails 23 by the stepping motor, servo motor 35 or the like. The heater 8 and the holding instrument are fitted to the driving device 31 which reciprocates the heater 8 and holding instrument between the upstream side and downstream side of the fixed mold 11 or movable mold 13. The driving device 31 has the driving part, shaft 34, etc. By way of example, in the driving part, the rotation of the stepping motor, servo motor 25 or the like is interlocked with the rotation of a ball screw, so that the heater 8 and holding instrument are moved up and down through the rotation of the ball screw.

The holding instrument has suction devices 90 or the like fitted at the rear face of the heater 8 to take the decorated molded product 100 or a sprue 122 remaining in the movable mold 13 before and after the insert film 7 is heated.

A method for manufacturing the decorated molded product according to the embodiment will be described now below.

According to the manufacturing method of this embodiment, the insert film 7 is held between the fixed mold 11 having the vacuum suction port 16 and the injection gate 14 for the molten resin 17 and, the movable mold 13 having the runner 112 faced to the injection gate 14 and leading to the cavity 10, whereby the pattern of the insert film 7 is formed to the molded product simultaneously with injection molding of the product. After the insert film 7 is pressed to the periphery of the cavity 10 at the surface of the fixed mold 11, the insert film 7 is tightly kept in touch with the fixed mold 11 through vacuum suction, and then the molds are closed. Subsequently, the molten resin 17 is injected from the injection gate 14, which flows through the runner 112 of the movable mold 13 from the hole formed in the insert film 7 to reach the cavity 10 and fill the gap between the insert film 7 and the movable mold 13.

The insert film 7 used in the manufacturing method of the embodiment has an upstream end thereof wound around the take-out roll device 2, while the other downstream end may be the cut end part. The insert film may be cut sheets of the film.

First, the insert film 7 is arranged between the fixed mold 11 having the injection gate 14 for the molten resin 17 and the movable mold 13 having the runner 112 facing the injection gate 14 and communicating with the cavity 10. The fixed mold 11 is subjected to vacuum suction through the vacuum suction port 16 thereof, so that the insert film 7 is tightly held in touch with the fixed mold 11. The insert film 7 is held between the fixed mold 11 and movable mold 13 when the molds are clamped (FIG. 1). The runner 112 of the movable mold 13 comprises the first runner 113, second runner 114, third runner 115, etc. The cavity 10 may be formed in the fixed mold 11 or in the movable mold 13. The movable mold 13 used has the first runner 113 narrowed in breadth at the position facing the injection gate 14 of the fixed mold 11 (FIG. 7). Or, the first runner 113 of the movable mold 13 may be used which is reduced in breadth at the position facing the injection gate 14 of the fixed mold 11 and also between the position facing the injection gate 14 of the fixed mold 11 and the fixing pin 111 (FIG. 8). In FIGS. 7 and 8, when the insert film 7 is pressed to the fixed mold 11 by the parting face 118 of the mold, the insert film 7 can be pressed more closely to the position facing the injection gate 14 of the fixed mold 11 and moreover, can be pressed more strongly owing to the action of a clamping force of the molds. Owing to this, the hole can be formed like a pin point in the insert film 7 when the molten resin 17 is injected into the runner 112, without breaking an unnecessary part of the insert film 7. The method is effective to prevent generation of cutting dust of the insert film 7 or large tongue-like broken elements of the insert film.

The insert film 7 is pressed to the surface of the fixed mold 11.

The above pressing is conducted by the first clamping device 4. The main clamp device 4 surrounding the cavity 10 and injection gate 14 has the clamp head of a shape conforming to the cavity 10 or a shape of two lateral bars, i.e., of a symbol "=", and the rod 42 pushing the clamp head to the fixed mold, etc. A plurality of clamping elements separated from the frame-like clamping member may be employed to clamp the insert film 7 sequentially to the parting face. A shield member of rubber or the like may be disposed at a part where the main clamp device 4 contacts thereby to obtain a hermetic seal when the insert film is pressed.

Next, the insert film 7 in the vicinity of the injection gate of the fixed mold 11 is brought in tight contact with the fixed mold 11 through vacuum suction. The vicinity of the injection gate is the vicinity of the position facing the injection gate 14 of the fixed mold 11.

The fixed mold 11 and movable mold 13 are clamped.

At this time, the insert film 7 may be pressed to the vicinity of the injection gate 14 of the fixed mold 11 by the fixing pin(s) 111 set in the movable mold 13.

One, fixing pin 111 or a plurality of fixing pins 111 not less than two are used to press the insert film. The plurality of fixing pins 111 may be arranged to press the insert film in a manner to surround the position facing the injection gate 14 of the fixed mold 11 (FIGS. 13, 14). The fixing pin 111 is in the shape of a circular column, a circular column having a front tapered end, a circular cone, an elliptic column, etc. (FIG. 14). The insert film 7 in the vicinity of the injection gate of the fixed mold 11 may be pressed by the head 121 of the fixing pin 111 which is the undercut pin (FIGS. 10–12). In this case, since an area of the insert film 7 pressed to the fixed mold 11 by the fixing pin 111 is wide, the insert film 7 can be pressed more intensely and a hole formed in the insert film 7 by the pressure of the molten resin 17 becomes smaller.

Figure 3:
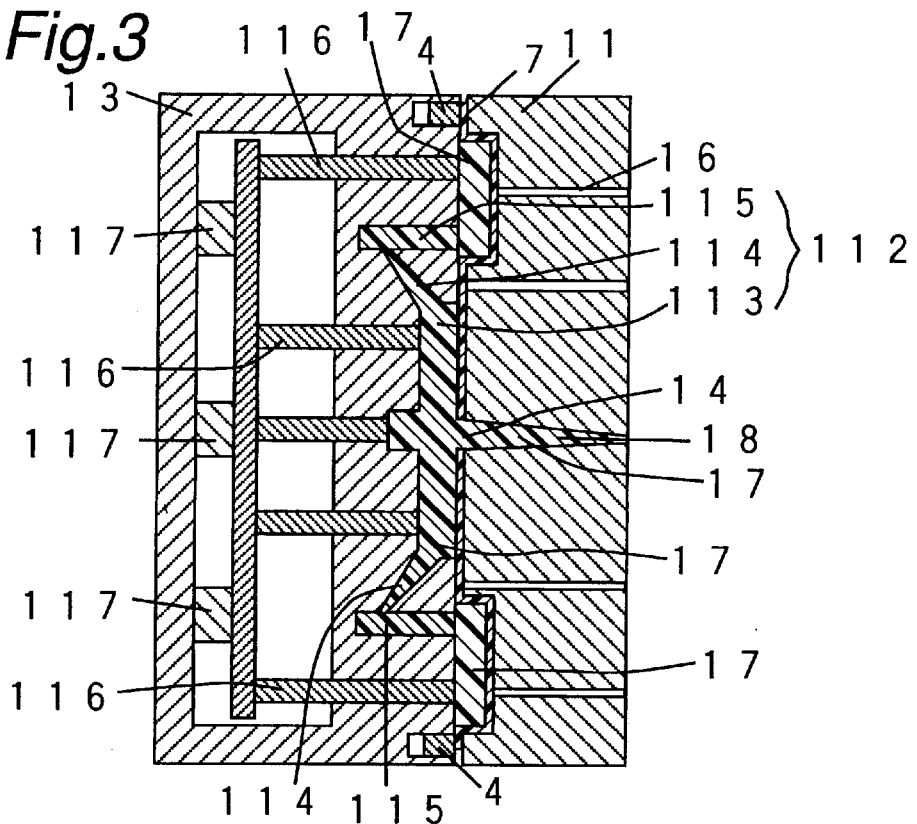
FIG. 3 is a sectional view showing another process in the apparatus and the method for manufacturing a decorated molded product in the embodiment of the present invention.
Figure 4:
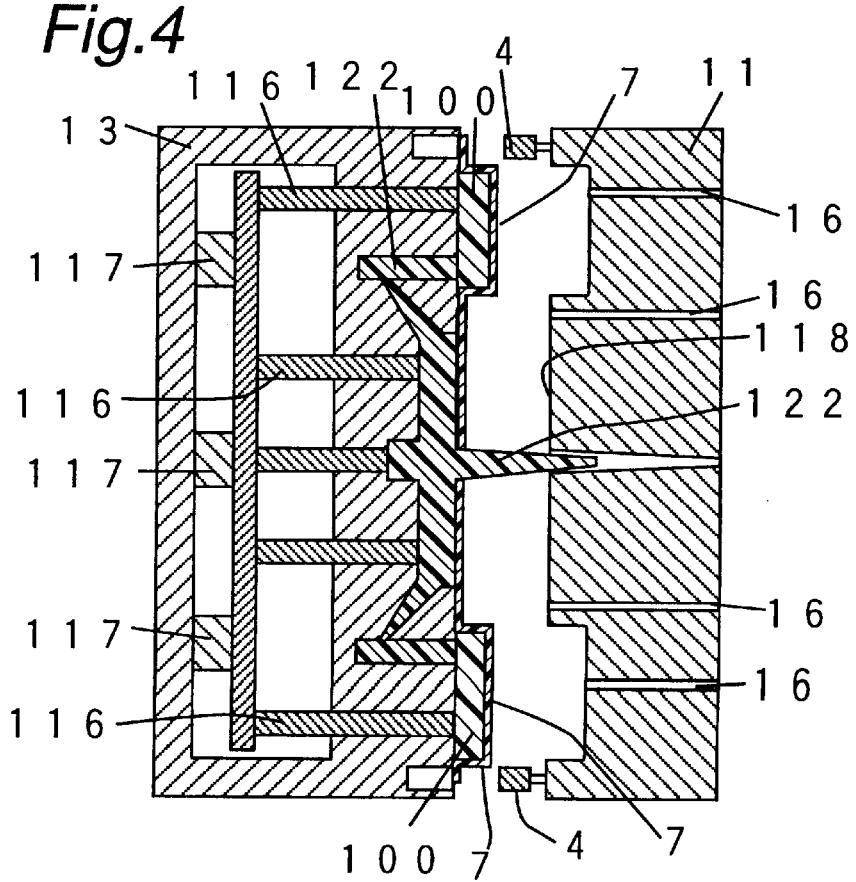
FIG. 4 is a sectional view showing another process in the apparatus and the method for manufacturing a decorated molded product in the embodiment of the present invention.

The molten resin 17 is injected from the injection gate 14, running in the runner 112 of the movable mold 13 from the hole formed in the insert film 7 to reach the cavity 10 and fill the gap between the insert film 7 and the movable mold 13 (FIG. 3).

The insert film 7 is broken by the heat and injection pressure of the molten resin 17, whereby the hole is formed. If the hot runner mold (FIG. 9) is used as the fixed mold 11, a front end of the heater (hot chip 12) is positioned close to the insert film 7 or in touch with the insert film 7, thereby melting the insert film 7 by heat, thus forming the hole. The molten resin 17 first enters the first runner 113 from the hole formed in the insert film 7, then moving to the second runner 114 and third runner 115 and eventually to the cavity 10 (FIG. 3). The molten resin 17 fills the cavity 10 (gap between the insert film 7 and movable mold 13) to be into touch with the insert film 7. While the bonding layer of the insert film 7 is kept in touch with the molten resin 17, the molten resin 17 is cooled and solidified, and consequently film 7 is bonded to the molded product.

The molten resin 17 is injected from the injection gate 14 of the fixed mold 11 to the first runner 113 by impressing the injection pressure by the injection apparatus to the molding material heated and melted to a plasticized state. The molding material is, e.g., polystyrene resin, polyethylene resin, polypropyrene resin, polyolefin resin, ABS resin, AS resin, AN resin or the like general-purpose resin. Such general-purpose engineering resin as polyphenylene oxide.polystyrene resin, polycarbonate resin, polyacetal resin, acrylic resin, polycarbonate modified polyphenylene ether resin, polybutylene terephthalate resin, super high molecular weight polyethylene resin; or such super engineering resin as polysulfone resin, polyphenylene sulfide resin, polyphenylene oxide resin, polyarylate resin, polyetherimide resin, polyimide resin, liquid crystal polyester resin, polyaryl heatproof resin, etc. may be used.

Finally, the fixed mold 11 and movable mold 13 are opened (FIG. 4) and the decorated molded product 100 having the insert film 7 bonded thereto is taken out (FIG. 5). In some cases, the sprue 122 formed by the third runner 115 may adhere to the decorated molded product 100. The sprue 122 is taken out from the first runner 113 and second runner 114. The molded product 100 and sprue 122 are ejected by the ejector pins 116 in the movable mold 13 thereby to be taken outside (FIG. 5).

If the undercut pin is used as the fixing pin 111, the head 121 is retreated in the slantwise upward direction of the first runner 113 because of sliding of the slide bar 120 when the fixed mold 11 and movable mold 13 are opened (FIG. 11), to a position where the head 121 is not located over the first runner 113 (FIG. 12). The head 121 is thus prevented from interfering with the sprue 122 when the sprue 122 is removed.

A concrete example of the manufacturing method of the embodiment will be described, wherein basically the above-described decorated molded product manufacturing apparatus comprising the injection mold 1, take-out roll device 2, film introduction device 3, main clamp device 4, cutting device 5, sub clamp device 6, take-out device 9 is employed.

The cut end part 70 of the insert film 7 is caught by the pinching device 30 of the film introduction device 3 set above the fixed mold 11 (FIG. 15). A slightly upper part of the cut end part 70 of the insert film 7 may be held or an edge of the cut end part 70 may be held by the device 30.

The pinching device 30 holding the cut end part 70 of the insert film 7 is moved by the driving device 31 of the film introduction device 3 towards the downstream side of the fixed mold 11 (FIG. 16), so that the insert film 7 is introduced between the main clamp device 4 and the fixed mold 11. The pattern of the insert film 7 is positioned at a front face of the cavity 10 of the fixed mold 11. Interlocked with a positioning sensor (not shown) of the driving device 31, the insert film 7 is positioned at a correct position of the cavity 10.

In a first example for moving the pinching device 30, the rotation of the ball screw shaft having the pinching device 30 set at a front end thereof is interlocked with the rotation of the stepping motor, servo motor or the like, thereby to induce the operation of the pinching device 30 through the rotation of the ball screw shaft.

In a second example (FIGS. 21–25), the hollow wire guide 56 and wire reel 57 are used. The pinching device 30 holding the insert film 7 is moved to the gap between the fixed mold 11 and main clamp device 4 because of its own weight.

In the above first example, since the rigid ball screw shaft is used, the pinching device 30 is effectively guided and pulled out linearly, which surely transfers the insert film 7 to a predetermined position. According to the second example, since the deformable wire 58 is used, the pinching device 30 is introduced and pulled out not only linearly, but flexibly in any optional direction, e.g., up/down direction, torsional direction or the like to the parting face 118 in conformity with a deformed shape of the main clamp device 4, an inclination or projections/recesses of the parting face 118 of the mold, a step difference of the injection gate and cavity 10, a complicated surface shape of the inner face of the cavity 10. In consequence, the gap between the main clamp device 4 and fixed mold 11 or between the fixed mold 11 and movable mold 13 is effectively turned to an optional shape or considerably narrowed (referring to FIG. 25).

The-cut end part 70 of the insert film 7 is fixed to the sub clamp device 6 (FIG. 16) to avoid a positional shift of the insert film 7 with respect to the fixed mold 11 when the insert film is freed from the pinching device 30. The fixing may be performed by holding the insert film 7 between rods of the sub clamp device or hooking the pins of the fixed mold 11 to holes of the insert film 7.

The pinching device 30 is pulled out from between the main clamp device 4 and fixed mold 11.

Figure 16:
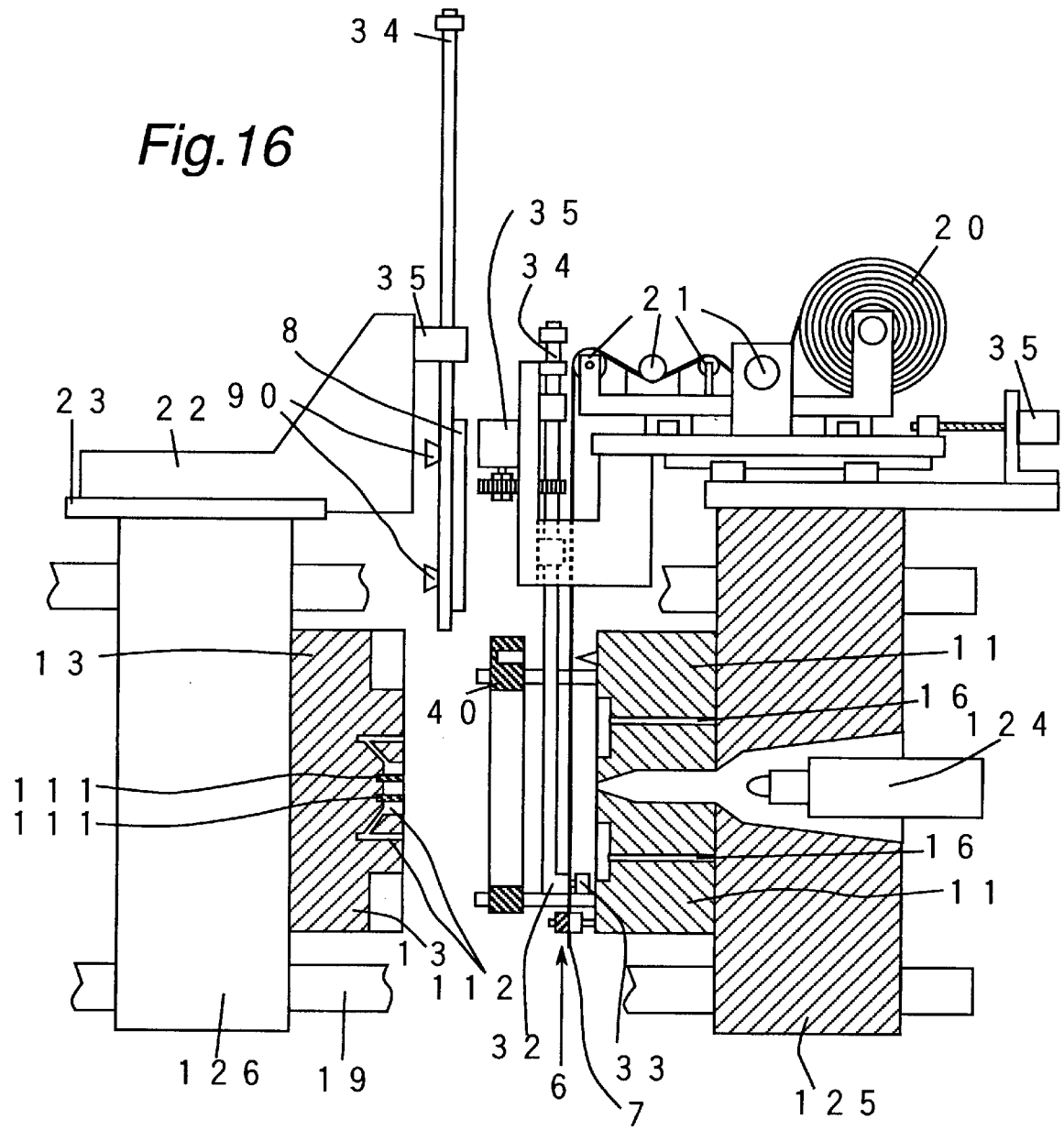
FIG. 16 is a partial sectional view showing another process in the apparatus and the method for manufacturing a decorated molded product in the embodiment of the present invention.

The pinching device 30 is pulled out while the cut end part of the insert film 7 is secured to the sub clamp device 6. The pulling-out of the pinching device is carried out by separating the pinch head 32 and pinch roll 33 of the pinching device 30 thereby to free the insert film 7 (FIG. 16). In this case, it is enough to pull out the pinching device 30 at least from the gap between the main clamp device 4 and fixed mold 11, that is, not to completely remove the pinching device 30 from the gap of the fixed mold 11 and movable mold 13. Even when the pinching device 30 is not perfectly separated away from the gap, the pinching device 30 can be stored in an accommodation part (not shown) formed in the movable mold 13 or fixed mold 11, hence not obstructing clamping of the molds, etc.

Figure 17:
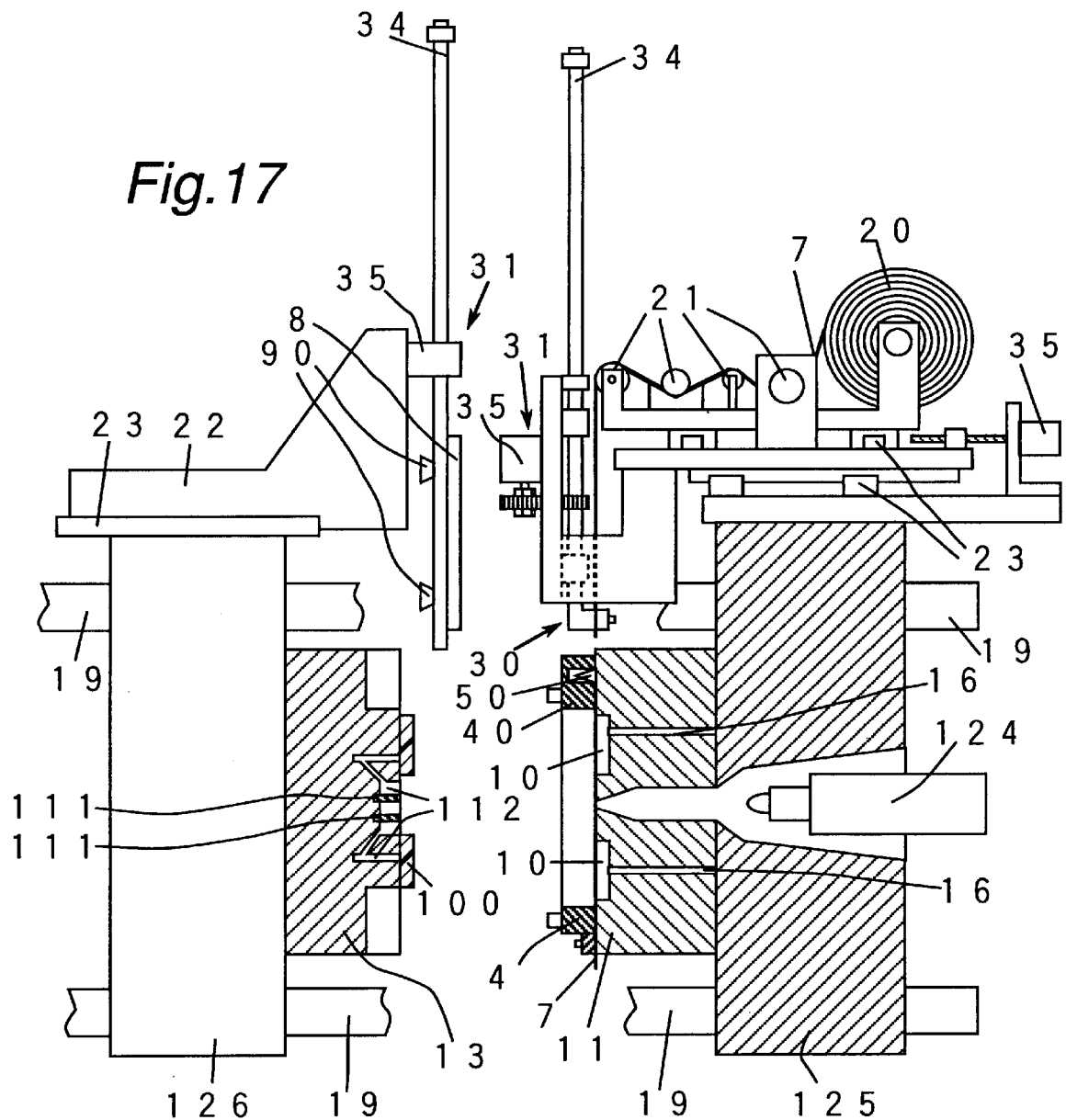
FIG. 17 is a partial sectional view showing another process in the apparatus and the method for manufacturing a decorated molded product in the embodiment of the present invention.

The insert film 7 is pressed to the fixed mold 11 by the main clamp device 4 (FIG. 17).

At this time, before the insert film 7 is pressed to the fixed mold 11 by the main clamp device 4, a constant tension is impressed to the insert film 7 by the take-out roll device 2 and sub clamp device 6, and consequently, the whole surface of the insert film 7 can be uniformly extended when brought in tight contact with the cavity 10 of the fixed mold 11 or the like. The insert film 7 is never held in touch with the fixed mold 11 while the film 7 is wrinkled or twisted. The insert film 7 may be pinched again by the pulled-out pinching device 30 and a fixed tension may be adjusted to be applied to the insert film 7 by the pinching device 30 and sub clamp device 6.

When the insert film 7 is pressed to the fixed mold 11 by the main clamp device 4, the insert film 7 is cut at the upstream side of the cavity 10.

The insert film 7 may be cut by the fixed mold 11 having the cutting blade 50 and the main clamp device 4 having the blade storage part 41 in the upstream clamp head. In another method, the insert film 7 after being pressed to the fixed mold 11 by the main clamp device 4 may be cut by the fixed mold 11 having the cutting blade 50 and the movable mold 13 having the blade storage part, or cut by sliding edges of both molds 11 and 13. The insert film 7 can also be cut by heating and melting with the use of the heat cutter 51 (FIGS. 24A, 24B). When the heat cutter 51 is used, cutting dust or the like is effectively not generated. The cutting blade may be provided in the pinching device 30 thereby to cut the insert film 7 when the pinching device 30 pinches the insert film with the pinch head 32 and the pinch roll 33. While the insert film 7 at an upper part of the cutting device 5 is held by the pinching device 30 between the fixed mold 11 and movable mold 13, the film may be cut by the cutting device 5 at the upstream side of the cavity 10 (FIGS. 24A, 24B).

In this case, the insert film 7 is cut at the upstream side of the cavity 10 of the mixed mold 11, in other words, it is enough to cut only one point of the insert film 7 at the upstream side, thus eliminating the need to cut the remaining three points in the periphery of the insert film, i.e., at the downstream side and both sides. Accordingly, cutting dust is not generated from the insert film 7 and prevented from entering the injection mold to adhere to the molded product. The rate of good products thus is increased. Since the cut insert film 7 is not wound up again, it is not necessary to secure a larger margin at both sides of the insert film 7. Moreover, since the upstream part of the insert film 7 is cut, it is not necessary to wind up the insert film afterwards, that is, a wind roll for the insert film is eliminated, thus saving costs for the insert film and the apparatus. The apparatus becomes compact and easy to handle. Furthermore, if the heat cutter 51 is used, cutting dust is quite difficult to generate, and the insert film 7 can be cut at the gap between the fixed mold 11 and movable mold 13. The cutting dust is not mixed in the molds and does not adhere to the molded product. The insert film 7 can be cut adjacent to the cavity 10, and waste of the insert film 7 is reduced economically (FIGS. 24A, 24B).

The insert film 7 is pressed by the main clamp device 4 simultaneously when the insert film 7 is cut, or at different timings. In the case where the insert film 7 is pressed and cut at separate times, either of the pressing and the cutting may be carried out earlier. if pressing and cutting are executed at the same time, the cutting blade 50 or heat cutter 51 is set at the upstream side of the cavity 10, and the upstream clamp head 40 of the main clamp device 4 is provided with the cutting blade storage part 41, thereby to press and cut the insert film 7 at the same time by the main clamp device 4.

Figure 18:
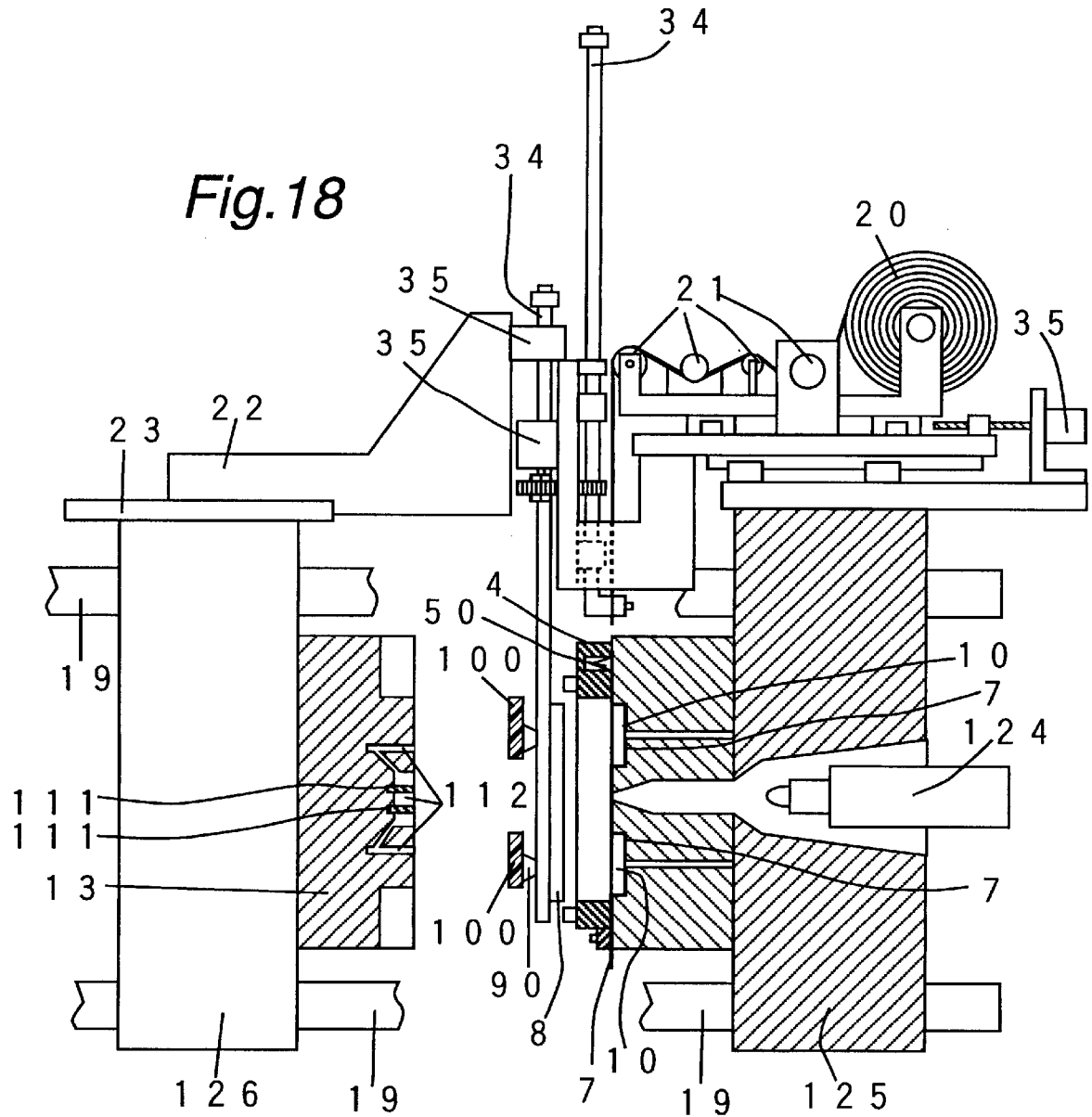
FIG. 18 is a partial sectional view showing another process in the apparatus and the method for manufacturing a decorated molded product in the embodiment, of the present invention.
Figure 19:
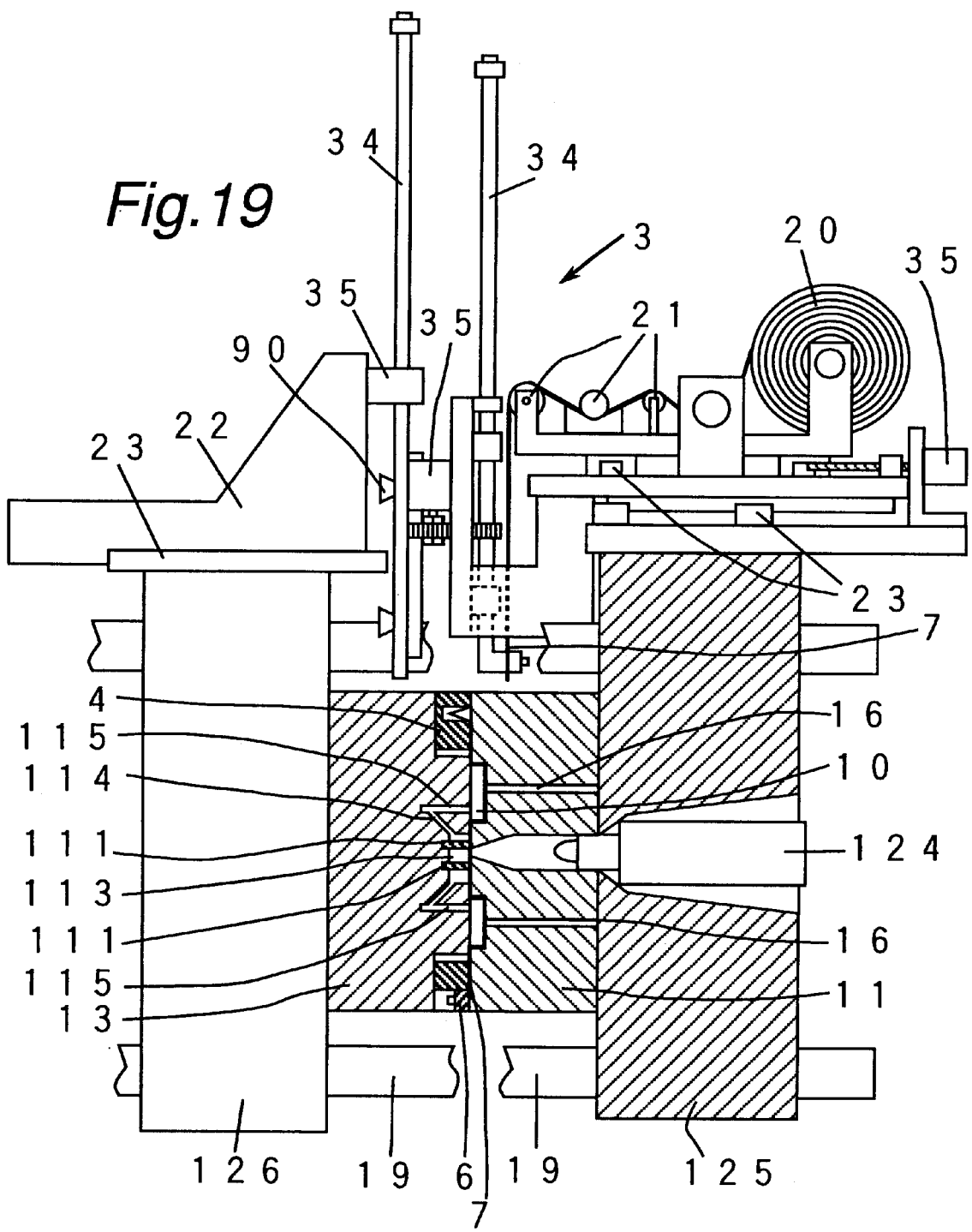
FIG. 19 is a partial sectional view showing another process in the apparatus and the method for manufacturing a decorated molded product in the embodiment of the present invention.

After the insert film 7 is pressed to the fixed mold 11 by the main clamp device 4, the take-out device 9 is inserted between the movable mold 13 and fixed mold 11 before the molten resin 17 is injected, and brought close to the fixed mold 11 to heat and soften the insert film 7. In addition, the insert film 7 is sucked through the vacuum suction port 16 to be in tight contact with the inner face of the cavity 10 (FIG. 18). Alternatively, before and after the insert film is heated, the take-out device 9 is moved close to the movable mold 13 and, the molded product 100 and sprue 122 adhering to the movable mold 13 are sucked by the suction devices 90 to be taken out from the movable mold 13.

The fixed mold 11 and movable mold 13 are closed (FIGS. 19, 3) and, the molten resin 17 is injected. The molten resin 17 first penetrates/breaks the insert film 7 pressed in the vicinity of the injection gate 14 of the fixed mold 11 by the fixing pins 111 set in the runner 112 of the movable mold 13, whereby the hole is formed in the insert film. When the hot runner mold is employed as the fixed mold 11 (FIG. 9), the front end of the heater (hot chip 12) is brought close to the insert film 7 or in touch with the insert film 7, so that the insert film 7 is melted by the heat of the heater (hot chip 12) and the hole is formed. The molten resin 17 enters the first runner 113 through the hole formed in the insert film 7, and flows sequentially to the second runner 114 and third runner 115 to the cavity 10, filling the gap (cavity 10) between the insert film 7 and movable mold 13. While the molten resin 17 filling the cavity 10 is kept in touch with the insert film 7, specifically the bonding layer of the insert film 7, the molten resin 17 is cooled and solidified, so that the insert film 7 is bonded to the molded product.

Thereafter, the insert film 7 pressed by the main clamp device 4 is freed and the fixed mold 11 and movable mold 13 are opened. At this time, the molded product 100 having the insert film 7 formed thereto may be left in the fixed mold 11 or movable mold 13. The decorated molded product is preferably taken out in cooperative operation of the ejector pins 116 of the movable mold 13 which projects the product 100 (FIG. 5) and the suction devices 90 of the take-out device 9 (FIG. 18).

According to this embodiment, the insert film 7 is held in tight contact with the fixed mold 11 through vacuum suction. After the insert film 7 is tightly pressed to the vicinity of the injection gate of the fixed mold 11, the molds are closed and the molten resin 17 is injected through the injection gate 14 of the fixed mold 11 to run through the runner 112 of the movable mold 13 from the hole formed in the insert film 7 to reach the cavity 10. In a different arrangement, the insert film 7 in the vicinity of the injection gate of the fixed mold 11 is pressed by the fixing pins 111 set in the runner 112 of the movable mold 13 and the molten resin 17 is injected from the injection gate 14 of the fixed mold 11 to flow out from the hole formed in the insert film 7 to the runner 112 of the movable mold 13 to the cavity 10. Accordingly, the insert film 7 can be secured to the fixed mold 11 by the main clamp device 4. Any of the film introduction device 3, cutting device 5, main clamp device 4, sub clamp device 6 and take-out device 9 can be mounted to the fixed mold 11, whereby the movable mold 13 becomes light-weight and can be opened/closed smoothly.

According to the present invention, the insert film is brought in tight contact with the fixed mold through vacuum suction, then the molds are closed and the molten resin is injected through the injection gate of the fixed mold to reach the cavity through the runner of the movable mold from the hole opened in the insert film. In such constitution, a punching device or film formation device for forming the hole in the insert film as in a conventional apparatus is eliminated, and therefore the mold structure is made compact, thereby ensuring a large space for the cavity. The present invention exerts superior practicality.

According to the present invention, the molten resin is injected from the injection gate of the fixed mold after the insert film is tightly kept in touch with the fixed mold through vacuum suction or after the insert film is pressed by the fixing pin(s) to the vicinity of the injection gate of the fixed mold. Therefore, the hole through which the molten resin passes is easily opened like a pin point in the insert film, with cutting dust not being generated and accumulated to clog the opening part of the runner or accumulated at the parting face to damage the molds. Moreover, the opening part of the runner set in the movable mold is prevented from being clogged by a large tongue-like broken element of the insert film. Accordingly, beautifully decorated molded products can thus be efficiently manufactured with a good yield without generating cutting dust.

The entire disclosure of Japanese Patent Application No. 8-38958 filed on Jan. 31, 1996, including specification, claims, drawings, and summary is incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

I claim:

1. An apparatus for manufacturing a decorated molded product which comprises:

an injection mold consisting of a fixed mold having a vacuum suction port and an injection gate for a molten resin, and a movable mold with a runner facing the injection gate and communicating with a cavity;

a film introduction device for introducing an insert film to a gap between the fixed mold and movable mold;

a first clamping device for pressing the insert film introduced by the film introduction device to a surface of the fixed mold in a manner to enclose the cavity and injection gate;

a cutting device, arranged at either a predetermined position at an upstream side of the surface of the fixed mold or a predetermined position of the first clamping device opposite to the upstream side, for cutting the insert film at the upstream side of the surface of the fixed mold when the insert film is pressed to the fixed mold by the first clamping device; and a second clamping device, arranged at a downstream side of the surface of the fixed mold, for securing a cut end part of the insert film.

2. A decorated molded product manufacturing apparatus according to claim 1, wherein the film introduction device is movable above the fixed mold.

3. A decorated molded product manufacturing apparatus according to claim 1, wherein the vacuum suction port is formed in a parting face of the fixed mold.

4. A decorated molded product manufacturing apparatus according to claim 1, wherein the cutting device is a heat cutter.

5. A method for manufacturing a decorated molded product which comprises holding an insert film between a fixed mold having a vacuum suction port and an injection gate for a molten resin and a movable mold having a runner facing the injection gate and communicating with a cavity, and forming a pattern of the insert film to a molded product simultaneously with injection molding of the product, said method comprising:

bringing the insert film in tight contact with the fixed mold through vacuum suction after pressing the insert film to a surface of the fixed mold by a first clamping device, closing the molds; and injecting the molten resin from the injection gate, whereby the molten resin passes through the runner of the movable mold from a hole formed in the insert film to reach the cavity thereby filling a gap between the insert film and movable mold.

6. A method for manufacturing a decorated molded product with use of a decorated molded product manufacturing apparatus in claim 1, which comprises:

pinching a cut end part of the insert film by a pinching device of the film introduction device;

moving the pinching device holding the cut end part of the insert film thereby to introduce the insert film to between the first clamping device and fixed mold so that a pattern of the insert film is positioned at a front face of the cavity of the fixed mold;

fixing the cut end part of the insert film to the second clamping device;

freeing the insert film from the pinching device; pulling out the pinching device from between the first clamping device and fixed mold;

cutting the insert film by the cutting device at the upstream side of the cavity when the insert film is pressed to the fixed mold by the first clamping device, and sucking the insert film through the vacuum suction port to be in tight contact with the fixed mold; and closing the fixed mold and movable mold, and injecting the molten resin to the cavity from the injection gate to fill a gap between the insert film and movable mold.

7. A decorated molded product manufacturing method according to claim 6, whereby the insert film is cut between the fixed mold and movable mold by the cutting device at the upstream side of the cavity while the insert film at an upper part of the cutting device is pinched by the pinching device.

8. A decorated molded product manufacturing apparatus according to claim 1, which is provided with a take-out roll device for taking out the insert, film, so that the insert film taken out from the take-out roll device is introduced to the gap between the fixed mold and movable mold by the film introduction device.

9. A decorated molded product manufacturing apparatus according to claim 1, wherein the insert film secured by the first clamping device and second clamping device is broken by heat and an injection pressure of the molten resin injected from the injection gate, whereby a hole is opened through which the injected molten resin is filled in the cavity through the runner.

10. A decorated molded product manufacturing apparatus according to claim 8, wherein the take-out roll device is movable above the fixed mold.

11. A decorated molded product manufacturing method according to claim 5, wherein the insert film is taken out from a take-out roll device and is pressed to the surface of the fixed mold by the first clamping device.

12. A decorated molded product manufacturing method according to claim 5, wherein the insert film is broken by heat and an injection pressure of the molten resin injected from the injection gate, whereby a hole is formed through which the injected molten resin is filled in the cavity through the runner.

* * * * *